(12) United States Patent  (10) Patent No.: US 7,527,078 B2
Driessen et al.  (45) Date of Patent: May 5, 2009

(54) APPARATUSES FOR DISPENSING MATERIALS VOLUMETRICALLY AND GRAVIMETRICALLY BASED ON A STORED FORMULA AND METHODS OF DISPENSING FORMULAS USING THE SAME

(75) Inventors: Martinus Evert Jan Leonardus Driessen, Oegstgeest (NL); Ronald Peter Krom, Sassenheim (NL)

(73) Assignee: Fluid Management, LLC, Wheeling, IL (US)

( * ) Notice: Subject to any disclaimer, the term of this patent is extended or adjusted under 35 U.S.C. 154(b) by 574 days.

(21) Appl. No.: 11/251,584

(22) Filed: Oct. 13, 2005

(65) Prior Publication Data

US 2007/0084520 A1  Apr. 19, 2007

(51) Int. Cl.
  B65B 1/04 (2006.01)
  B65B 1/32 (2006.01)
  B65B 3/04 (2006.01)
  B65B 3/28 (2006.01)
(52) U.S. Cl. .............................. 141/9; 141/83; 141/104
(58) Field of Classification Search .................... 141/1, 141/2, 9, 83, 100, 104; 222/1, 56, 58, 63, 222/64, 77
See application file for complete search history.

(56) References Cited

U.S. PATENT DOCUMENTS

| | | | | |
|---|---|---|---|---|
| 4,272,824 A | * | 6/1981 | Lewinger et al. | ............ 700/265 |
| 4,582,097 A | * | 4/1986 | Izzi et al. | ....................... 141/1 |
| 4,662,409 A | * | 5/1987 | Egli | .............................. 141/1 |
| 4,844,297 A | * | 7/1989 | Smith | ............................. 222/1 |
| 4,961,887 A | | 10/1990 | Crumpler et al. | |
| 5,109,894 A | * | 5/1992 | McGregor | .................... 141/83 |
| 5,309,955 A | * | 5/1994 | Torterotot | ..................... 141/1 |
| 5,340,211 A | | 8/1994 | Pratt | |
| 5,365,722 A | | 11/1994 | Edwards et al. | |
| 5,487,603 A | * | 1/1996 | Hoff et al. | ................... 366/141 |

(Continued)

FOREIGN PATENT DOCUMENTS

AU  2002356693 A1  6/2003

(Continued)

OTHER PUBLICATIONS

International Bureau, "*International Preliminary Report on Patentability*", Apr. 24, 2008, 2 Pages.

(Continued)

*Primary Examiner*—Timothy L Maust
*Assistant Examiner*—Nicolas A Arnett
(74) *Attorney, Agent, or Firm*—Miller, Matthias & Hull

(57) ABSTRACT

An improved dispensing system and dispensing routine for multiple ingredient formulas is disclosed. The system includes a controller linked to an actuator, a scale and, a means for imparting movement to a plurality of pumps or conveyors and containers for dispensing the plurality of ingredients. After a formula is selected, the controller acts to at least partially load the pump with the first of said ingredients, reads the scale to account for the weight of the receptacle, calculates the motion of the pump required to dispense the target amount of said first ingredient, and either executes a percentage or portion of the motion of the pump required to dispense the target amount of said first ingredient, leaving a remaining amount or a safety factor in the form of a previously determined <maximum overshoot> value.

20 Claims, 10 Drawing Sheets

U.S. PATENT DOCUMENTS

| | | | |
|---|---|---|---|
| 5,623,976 | A | 4/1997 | Muscara |
| 6,193,053 | B1 | 2/2001 | Gaalswyk |
| 6,334,471 | B1 * | 1/2002 | Graffin .................. 141/83 |
| 6,540,486 | B2 * | 4/2003 | Amsler et al. ............. 417/53 |
| 6,732,597 | B1 * | 5/2004 | Brandt, Jr. ............ 73/861.73 |
| 6,945,431 | B2 | 9/2005 | Miller |
| 6,945,689 | B2 | 9/2005 | Armendariz et al. |
| 6,945,690 | B2 | 9/2005 | Armendariz et al. |
| 6,953,279 | B2 | 10/2005 | Midas et al. |
| 6,955,465 | B2 | 10/2005 | Machacek et al. |
| 6,960,012 | B1 | 11/2005 | Biber |
| 6,987,228 | B1 * | 1/2006 | MacMichael et al. ....... 177/116 |
| 7,311,223 | B2 * | 12/2007 | Post ........................ 222/1 |
| 2003/0121561 | A1 | 7/2003 | Wagner et al. |
| 2003/0230355 | A1 | 12/2003 | Bartholomew et al. |
| 2005/0087545 | A1 * | 4/2005 | Petrus Engels et al. ......... 222/1 |
| 2005/0205154 | A1 | 9/2005 | Cleveland et al. |
| 2005/0210834 | A1 | 9/2005 | Kamineni |
| 2005/0211660 | A1 | 9/2005 | Galownia et al. |
| 2005/0211661 | A1 | 9/2005 | Galownia et al. |
| 2005/0213426 | A1 | 9/2005 | Midas et al. |
| 2005/0217755 | A1 | 10/2005 | Vargas |
| 2005/0218149 | A1 | 10/2005 | Walsh et al. |
| 2005/0218166 | A1 | 10/2005 | Mehan |
| 2005/0232731 | A1 | 10/2005 | Lund |
| 2005/0269367 | A1 * | 12/2005 | Post ........................ 222/185.1 |

FOREIGN PATENT DOCUMENTS

| | | |
|---|---|---|
| DE | 10159272 A1 | 6/2003 |
| EP | 1276670 B1 | 9/2005 |
| EP | 1417024 B1 | 9/2005 |
| EP | 1580151 A1 | 9/2005 |
| EP | 1214566 B1 | 10/2005 |
| JP | 2005-153938 A | 6/2005 |
| WO | WO 03047737 | 6/2003 |
| WO | WO-2005/090165 A1 | 9/2005 |

OTHER PUBLICATIONS

International Bureau, "*International Written Opinion of the International Searching*", Apr. 24, 2008, 8 Pages.

* cited by examiner

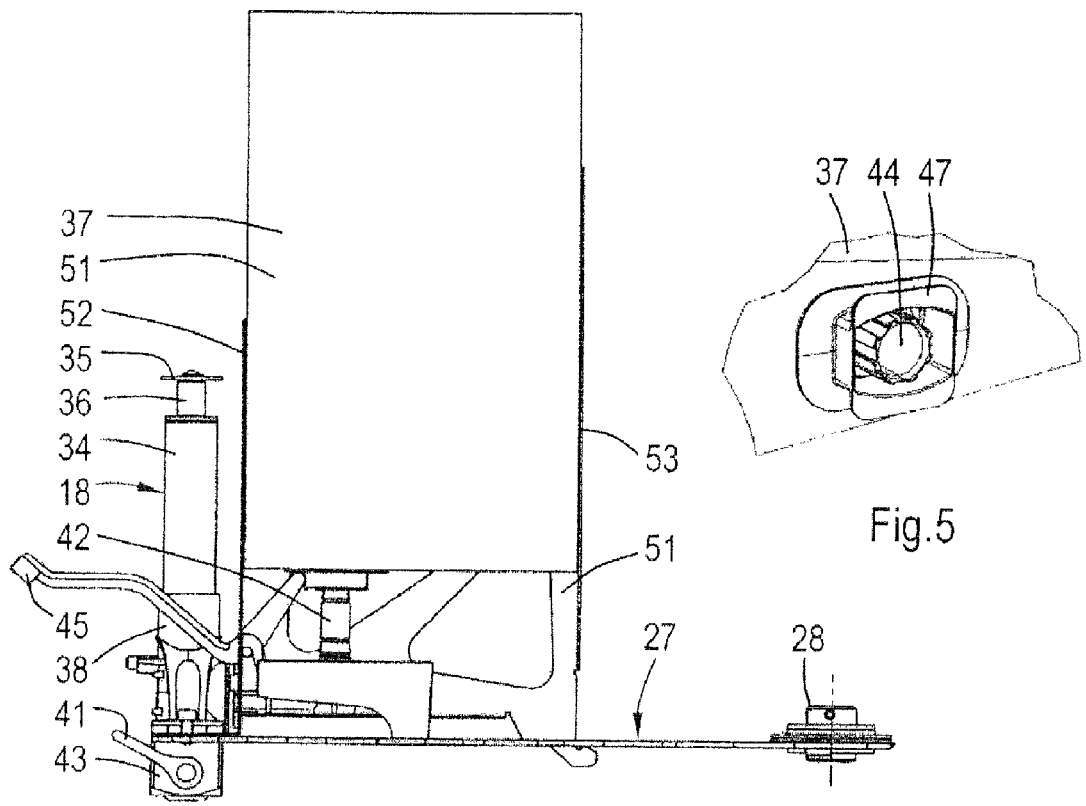
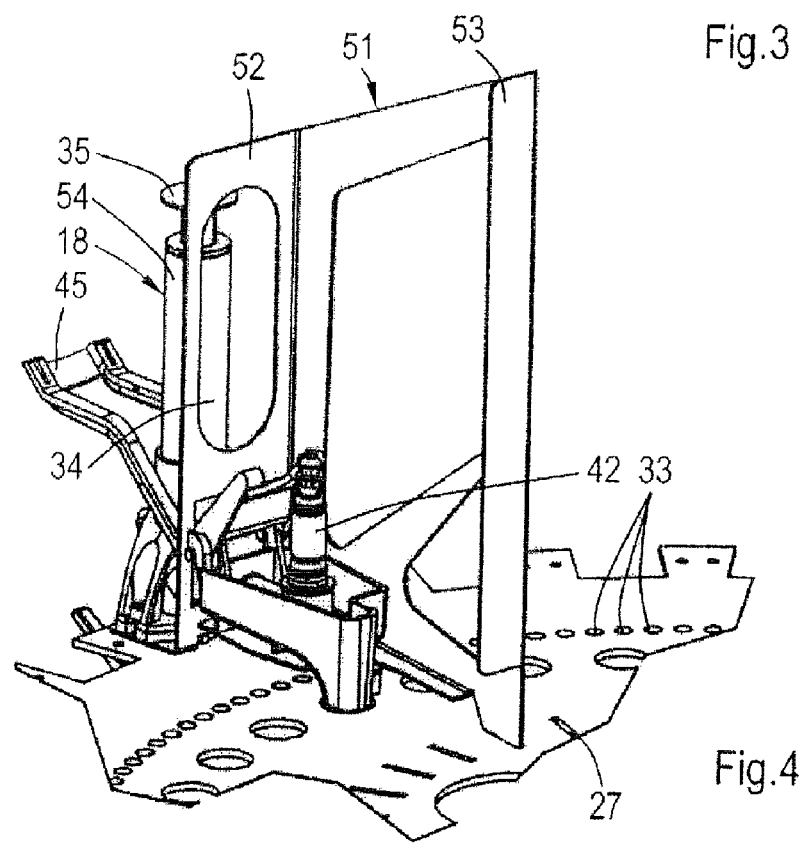

APPARATUSES FOR DISPENSING MATERIALS VOLUMETRICALLY AND GRAVIMETRICALLY BASED ON A STORED FORMULA AND METHODS OF DISPENSING FORMULAS USING THE SAME

BACKGROUND

1. Technical Field

Apparatuses and methods are disclosed for dispensing a plurality of formulas volumetrically and gravimetrically using a controller having a memory that stores a plurality of formulas. The controller is linked to a plurality of pumps or conveyors, with each pump connected to a container holding one of the materials to be dispensed according to one of the formulas. The controller is also linked to a scale for measuring the amount of liquid or powder dispensed by its respective pump. The disclosed apparatuses and methods are applicable to liquid and powder ingredients.

2. Background of the Related Art

Multiple pump dispensing systems have been used in the paint industry. Specifically, such a dispensing system incorporating multiple pumps that dispense viscous fluids such as paint colorant from flexible packages is disclosed in U.S. Pat. No. 6,273,298, which is commonly owned with the present application. Typically, such systems include piston pumps mounted on a rotary turntable with each pump coupled to a flexible package containing a viscous fluid, such as a paint colorant. The turntable, pumps and packages mounted thereon, are rotated until the desired pump and package is disposed over the container to be filled. A control system is utilized to rotate the table and control the action of the pumps to control the amount of material dispensed from the packages by the pumps into the container. The linear type dispensing systems are also known.

Some currently available paint colorant dispensers utilize nutating pumps and a computer control system to control the nutating pumps. Nutating pumps have a piston which is positioned inside of a housing having a fluid inlet and a fluid outlet. The piston simultaneously slides axially and rotates inside the housing. The dispense stroke or cycle can be broken down into a number of discreet steps or segments for extremely accurate volumetric dispenses. For example, a minimum dispense can be as little as 1/256 of a fluid ounce as illustrated in U.S. Pat. Nos. 6,749,402, 6,540,486 and 6,398,515, all commonly assigned with the present application. These patents all disclose improved nutating pump technologies that are applicable to paint colorant dispensing as well as the dispensing of hair dyes, other cosmetics applications and other fluids.

Systems that dispense by volume only (i.e., not by weight) offer fast dispense times because feedback is not required. However, volumetric dispensing is not as accurate as gravimetric dispensing as air bubbles or density variations can compromise the accuracy of the amounts dispensed.

Another approach to liquid dispensing accuracy can be found in U.S. Pat. No. 5,365,722, which discloses a calibration scheme based on the ratio of impeller rotations to the weight of material dispensed. A first dispense amounting to about 95% of the target fill is carried out at a high flow rate followed by subsequent smaller dispenses at lower and lower flow rates until the target is reached. The low flow rates at the end of the dispense are necessary because a dispense in excess of the desired amount may result in the product being rejected. In short, once too much of an ingredient has been dispensed, there is no way to correct the error without rejecting that batch and starting over. However, this approach is slow as it requires multiple dispense cycles to reach the target and final cycles are carried out at very low flow rates.

Like paint, the color spectrum for hair dyes is broken down into dozens of different colors. Further, consumers having dry, normal or oily hair may require products especially formulated for their hair type. Specialized colors may be made for gray hair as opposed to more youthful hair. Coloring products may also be customized for curly hair, thin hair, afro, etc. Mixing ratios of the colorant and developer can vary greatly depending upon the desired effect. Therefore, in addition to the rainbow of shades that are necessary to meet public demand, stores are confronted with the significant problem of trying to stock all of the colors for the various hair types.

To address this problem, point-of-sale hair dye dispensing machines have been developed. One such machine is disclosed in U.S. Publication No. 2005/0087545, which is commonly owned with the present application. The machine includes a plurality of containers for storing various colorants or dye intermediates and developer solutions that typically contain an oxidizer (e.g., hydrogen peroxide).

Similar to the hair dye problem, not all cosmetic products are universally applicable. Consumers having dry, oily or normal skin may require treatment products especially formulated for their particular condition. Hair products including shampoos, conditioners, hair dyes and permanent wave solutions are all quite sensitive to individual characteristics of the treated hair. No generic formula fits all types. Even more complicated are color cosmetics. A rainbow of shades is necessary to meet public demand. Stores find it a significant problem to stock all possible variations of a particular color cosmetic. One type of multiple formula liquid dispenser is disclosed in the commonly assigned U.S. Pat. No. 6,935,386.

European regulations are becoming increasingly hostile to volatile organic components (VOCs). Because many liquid ingredients of paints, cosmetics and hair dyes contain VOCs, manufacturers and retailers are turning to powder ingredient and using water as a primary solvent. Therefore, powder dispensing systems have been developed. Co-pending U.S. application Ser. Nos. 10/841,275 and 11/100,360 disclose multiple powder dispensing systems.

The software or algorithms used to accurately dispense liquids or powders volumetrically, gravimetrically or a combination thereof tend to be complicated and require frequent calibration. As electronic scales become necessary when accuracy is paramount, electronic scales are slow operating devices and their use can increase dispense times. Further, the consumer, often with the help of a sales technician, uses the controller and software to choose the desired formulation. This process can be tedious and time consuming as the controller will require the consumer to answer numerous questions when determining the characteristics of the product to be dispensed. Then, after a formulation is chosen, the machine must execute the selected formulation, dispense the desired volume of said ingredient and then repeat the procedure for each ingredient of the selected formulation. Whether the dispense is volumetric, gravimetric or a combination of the two, the slow dispense process in combination with the selection process results in the entire operation taking several minutes or longer.

Therefore, to satisfy the needs of today's time pressured and time conscious consumers, an improved dispensing methodology that provides for faster dispense times for multiple ingredient formulations where the ingredients may be liquid or powder or a combination of liquids and powders.

SUMMARY OF THE DISCLOSURE

In satisfaction of the aforenoted needs, improved methods for dispensing liquid ingredients of a formula from an automated machine are disclosed. One improved method comprises selecting a formula calling for n ingredients, with each ingredient having a target amount, and wherein n is an integer; calculating a motion of the pump required to dispense less than the target amount of said one of the n ingredients; executing a percentage of said motion of the pump required to dispense said less than the amount of said one of the n ingredients; reading a scale and determining an additional remaining amount of said one of the ingredients needed to meet the target amount; dividing said remaining amount by two (2) to calculate a first half amount and calculating a motion of the pump required to dispense said first half amount; executing said motion of the pump required to dispense said half amount and reading the scale to determine an actual first half amount dispensed; subtracting the actual first half amount from said first half amount to generate a difference or differential, multiplying the difference by two (2) and adding the result to said first half amount to calculate a second half amount and calculating a motion of the pump required to dispense said second half amount; and executing said motion of the pump required to dispense said second half amount.

In a refinement, the method further comprises reading the scale to determine an actual amount dispensed after the dispensing of said second half amount.

In another refinement, values for the difference between the first half amount and the actual first half amount dispensed are inputted to a calibration table stored in a memory for use in future calculations relating to the motion of the pump. In a related refinement, values for the difference between the second half amount and the actual second half amount dispensed are also inputted to the calibration table stored for use in future calculations relating to the motion of the pump.

In a refinement, the less than the target amount of initially dispensed for each ingredient ranges from about 70% to about 95% of the target amount for that ingredient. In a further refinement of this concept, the less than the target amount is greater than 90% of the target amount. In another refinement, the additional amount (i.e., the amount remaining to be dispensed after the initial "less than the target amount is dispensed") is an amount that is less than two full strokes of a piston pump if the pump is a piston pump or two rotation so the screw feeder of the metering pump if the pump is a metering pump.

In a refinement, each of the n ingredients is provided in its own reservoir that is in communication with its own pump and the pumps or conveyors are mounted on a rotary turntable.

In a refinement, the selecting further comprises selecting the formula from a memory in which a plurality of formulas are stored. In a related refinement, the selecting further comprises selecting a total weight of the formula to be dispensed in addition to the selecting of the formula.

In a refinement, any calculation of the motion of the pump for a particular ingredient may comprise using a calibration table or a table of stored values that are updated at least periodically and preferably at least once during each dispense to calculate the desired motion of the pump. Preferably, there is a separate pump and a separate set of calibration values for each ingredient.

In a refinement, the motion of each pump is executed by a stepper motor under the control of a controller and the calculating of the motion of the pump comprises using a calibration table to calculate the number of steps for the stepper motor. In a related refinement, the using of the calibration table comprises using a linear approximation of the number of steps (S) according to an equation $S = A \cdot V_{half} + B$ where A and B are calculated from the calibration table using a least square method and $V_{half}$ is the first half amount (i.e., $V_{remaining}/2$). In another related refinement, new values for S, A and B are calculated for each dispense and stored in the calibration table.

In yet another embodiment, each pump is a nutating pump as opposed to a conventional piston pump.

In a refinement, the formulas for a hair dye or a cosmetic application.

In an embodiment, selecting a total weight of the formula to be dispensed in addition to the selecting of the formula.

In an embodiment, the reading of the scale and accounting for the weight of the receptacle comprises zeroing of the scale.

In a further refinement, a dispensing system is disclosed, which comprises: a scale; the scale linked to a controller, the controller comprising a memory with a plurality of formulas, each formula comprising n amounts of n ingredients, wherein n is an integer; the controller selectively linked to a plurality of pumps by an activator, each pump coupled to a separate reservoir containing one of said ingredients, the pumps and reservoirs being disposed on a turntable; the turntable being linked to a motor for imparting rotation to the turntable; the controller being linked to a user interface, the controller being programmed to receive an instruction from a user interface to execute the dispensing of one of said formulas, and upon receiving said instruction, the controller carrying out a sequence comprising: selecting a formula calling for n ingredients, with each ingredient having a target amount, wherein n is an integer; calculating a motion of the pump required to dispense less than the target amount of said one of the n ingredients; executing a percentage of said motion of the pump required to dispense said less than the amount of said one of the n ingredients; reading a scale and determining an additional amount of said one of the ingredients needed to meet the target; dividing said remaining amount by about two (2) to calculate a first half amount and calculating a motion of the pump required to dispense said first half amount; executing said motion of the pump required to dispense said first half amount and reading the scale to determine an actual first half amount dispensed; subtracting the actual first half amount from said first half amount to generate a difference, multiplying the difference by about two (2) and adding the result to said first half amount to calculate a second half amount and calculating a motion of the pump required to dispense said second half amount; and executing said motion of the pump required to dispense said second half amount.

In another refinement, an improved method is disclosed for dispensing a plurality of flowable ingredients provided in individual containers and utilizing individually controlled dispense pumps that each draw one flowable ingredient from its individual container, the pumps being positionable to dispense into a common receptacle associated with a weighing device, the weighing device and pumps linked to a controller having a memory, the method comprising: operating a selected pump to move an initial assumed amount of one of the flowable ingredients that is less than a target amount for said ingredient into the container; weighing the container and determining an actual initial amount dispensed and subtracting that actual initial amount from the target amount to determine a remaining amount; dividing the remaining amount by two (2) or about two to generate a first half amount; calculating movement of the selected pump needed to dispense the first half amount of the flowable ingredient into the container; moving the pump to dispense the first half amount and weighing the container and determining an actual first half amount dispensed by the pump; comparing the actual first half amount to the first half amount and determining a first deviation determination; utilizing the first deviation determination to adjust the first half amount and calculate a second half amount; calculating movement of the pump needed to dispense the second half amount; and moving the pump to dispense the second half amount.

In a refinement, the calculating of the movement of the pump needed to dispense the first and second half amounts comprises using a calibration table stored in the memory.

In a refinement, the calculating of the movement of the pump needed to dispense the first half amount comprises using a calibration table stored in the memory, and the calibration table is modified after determining the first deviation determination and the calculating of the movement of the pump needed to dispense the second half amount comprises using the modified calibration table.

In another refinement, the method further comprises weighing the container and determining an actual second half amount dispensed and comparing the actual second half amount to the second half amount and determining a second deviation determination and modifying the calibration table again based on the second deviation determination.

Another method is disclosed for dispensing a plurality of ingredients of a formula, the method comprising:

a) selecting a formula calling for n ingredients, with each ingredient having a target amount, wherein n is an integer;

b) calculating a motion of the pump required to dispense less than the target amount of said one of the n ingredients;

c) executing a percentage of said motion of the pump required to dispense said less than the amount of said one of the n ingredients;

d) reading a scale and determining an additional amount of said one of the ingredients needed to meet the target;

e) dividing said additional amount by two (2) to calculate a first half amount and calculating a motion of the pump required to dispense said first half amount based on a calibration formula stored in the memory;

f) executing said calculated motion of the pump required to dispense said first half amount and reading the scale to determine an actual first half amount dispensed;

g) subtracting the actual first half amount from said first half amount to generate a first difference, multiplying the difference by two (2) and adding the result to said first half amount to calculate a second half amount;

h) using the first difference to modify the calibration formula stored in the memory and calculating a motion of the pump required to dispense said second half amount based upon the modified calibration formula;

h) executing said motion of the pump required to dispense said second half amount;

i) reading the scale to determine an actual second half amount dispensed, subtracting the actual second half amount from said second half amount to generate a second difference, and using the second difference to re-modify the calibration formula.

A flowable ingredient dispenser is also disclosed which comprises a scale, the scale linked to a controller, the controller comprising a memory with a plurality of formulas, each formula comprising n amounts of n ingredients, wherein n is an integer; the controller selectively linked to a plurality of pumps by an activator, each pump coupled to a separate reservoir containing one of said ingredients, the controller being linked to a user interface, the controller being programmed to receive an instruction from a user interface to execute the dispensing of one of said formulas, and upon receiving said instruction, the controller carrying out a sequence comprising a) selecting a formula calling for n ingredients, with each ingredient having a target amount, wherein n is an integer;

b) calculating a motion of the pump required to dispense less than the target amount of said one of the n ingredients;

c) executing a percentage of said motion of the pump required to dispense said less than the amount of said one of the n ingredients;

d) reading a scale and determining an additional amount of said one of the ingredients needed to meet the target;

e) dividing said additional amount by 2 to calculate a first half amount and calculating a motion of the pump required to dispense said first half amount based on a calibration formula stored in the memory;

f) executing said calculated motion of the pump required to dispense said first half amount and reading the scale to determine an actual first half amount dispensed;

g) subtracting the actual first half amount from said first half amount to generate a first difference, multiplying the difference by 2 and adding the result to said first half amount to calculate a second half amount;

h) calculating a motion of the pump required to dispense said second half amount;

i) executing said motion of the pump required to dispense said second half amount;

j) reading the scale to determine an actual second half amount dispensed, subtracting the actual second half amount from said second half amount to generate a second difference;

k) using at least one of the first for second differences or both to modify the calibration formula.

Another method is disclosed for dispensing a calibrated amount of a flowable ingredient by a pump operated by a stepper motor. The stepper motor is controlled by a controller having a memory. The method comprises a) selecting a target amount of an ingredient to be dispensed into a container;

b) defining an upper limit for a calibrated dispense of the ingredient by the pump;

c) operating the pump to dispense an initial amount of the ingredient into the container that is less than the target amount and until a remaining amount remains to be dispensed to reach the target amount and wherein the remaining amount is less than the upper limit for a calibrated dispense;

d) weighing the container and the actual initial amount of the ingredient and determining an actual remaining amount needed to reach the target amount, e) calculating a number of steps by the stepper motor needed to dispense the actual remaining amount using calibration data stored in the memory of the controller, f) reducing the number of steps by an overshoot factor determined by historical overshoot data of previous dispenses stored in the memory of the controller, g) operating the stepper motor by the reduced number of steps, h) weighing the container and the actual amount dispensed in part (g);

i) repeating parts (d) through (h) until a final amount of the ingredient has been dispensed into the container that is within an allowed tolerance for the ingredient.

In a refinement, part (e) above further comprises selecting a group of data points from the calibration table within a vicinity of the actual remaining amount and generating a linear equation from the group of points using the least squares method and calculating the number of steps from the linear equation.

In another refinement, the overshoot factor is calculated from historical overshoots by the pump and stepper motor within the group of data points.

In another refinement, the number of steps is reduced in part (f) by substituting the actual remaining amount in a revised linear equation with a slope equal to a slope for the linear equation generated in part (e) but which intersects an axis representing the number of steps at a lower point than that of the linear equation generated in part (e).

In another refinement, the linear equation is shifted to reduce the number of steps to accommodate for the overshoot factor.

In another refinement, the overshoot factor has a maximum limited value to avoid very slow dispensing following a stray measurement.

In another refinement, the method further comprises storing the number of steps and actual amount dispensed in part (g) as a new data point in the memory of the controller.

In another refinement, the method further comprises deleting the oldest data point after the storing of the new data point.

In another refinement, the method further comprises discarding the container if the final amount is higher than the target amount plus the allowed tolerance.

Yet another method is disclosed for dispensing a calibrated amount of a powder ingredient by a pump operated by a stepper motor. The pump includes a large screw and a small screw. The stepper motor is controlled by a controller having a memory. The disclosed method comprises:

a) selecting a target amount of an ingredient to be dispensed into a container;

b) defining an upper limit for a calibrated dispense of the ingredient by the large screw and an upper limit for a calibrated dispense by the small screw;

c) (i) if the target amount is greater than the upper limit for the large screw, operating the large screw to dispense an initial amount of the ingredient into the container that is less than the target amount and until a remaining amount remains to be dispensed to reach the target amount and wherein the remaining amount is less than the upper limit for the large screw, (ii) if the target amount is less than the upper limit for the large screw but greater than the upper limit for the small screw, carrying out parts (d) through (h) using calibration data for the large screw, and (iii) if the target amount is less than the upper limit for the small screw, carrying out parts (d) through (h) using calibration data for the small screw;

d) weighing the container and the actual initial amount of the ingredient and determining an actual remaining amount needed to reach the target amount, e) calculating a number of steps by the stepper motor needed to dispense the actual remaining amount using calibration data stored in the memory of the controller, f) reducing the number of steps by an overshoot factor determined by historical overshoot data of previous dispenses stored in the memory of the controller, g) operating the stepper motor by the reduced number of steps, h) weighing the container and the actual amount dispensed in part (g);

i) repeating parts (d) through (h) until a final amount of the ingredient has been dispensed into the container that is within an allowed tolerance for the ingredient.

In another refinement, part (e) further comprises selecting a group of data points from the calibration table within a vicinity of the actual remaining amount and generating a linear equation from the group of points using the least squares method and calculating the number of steps from the linear equation.

In another refinement, the overshoot factor is calculated from historical overshoots by the pump and stepper motor within the group of data points.

In another refinement, the number of steps is reduced in part (f) by substituting the actual remaining amount in a revised linear equation with a slope equal to a slope for the linear equation generated in part (e) but which intersects an axis representing the number of steps at a lower point than that of the linear equation generated in part (e).

In another refinement, the linear equation is shifted to reduce the number of steps to accommodate for the overshoot factor.

In another refinement, the overshoot factor has a maximum limited value to avoid very slow dispensing following a stray measurement.

In another refinement, the method also comprises storing the number of steps and actual amount dispensed in each part (g) performed for each screw as a new data point in the memory of the controller.

In another refinement, the method also comprises deleting the oldest data point after the storing of the new data point.

In another refinement, the method also comprises discarding the container if the final amount is higher than the target amount plus the allowed tolerance.

In another refinement, the calibration data for each screw is divided into equal segments of steps and the deleting of the oldest data point after the storing of the new data point is performed for each individual segment.

A powder ingredient dispenser is also disclosed which comprises a scale, the scale linked to a controller, the controller comprising a memory with a plurality of formulas, each formula comprising n amounts of n ingredients, wherein n is an integer; the controller selectively linked to a plurality of screw pumps by an activator, each screw pump coupled to a separate reservoir containing one of said ingredients, the controller being linked to a user interface, the controller being programmed to receive an instruction from a user interface to execute the dispensing of one of said formulas, and upon receiving said instruction, the controller carrying out a sequence comprising a) selecting a target amount of an ingredient to be dispensed into a container;

b) defining an upper limit for a calibrated dispense of the ingredient by the pump;

c) operating the pump to dispense an initial amount of the ingredient into the container that is less than the target amount and until a remaining amount remains to be dispensed to reach the target amount and wherein the remaining amount is less than the upper limit for a calibrated dispense;

d) weighing the container and the actual initial amount of the ingredient and determining an actual remaining amount needed to reach the target amount, e) calculating a number of steps by the stepper motor needed to dispense the actual remaining amount using calibration data stored in the memory of the controller, f) reducing the number of steps by an overshoot factor determined by historical overshoot data of previous dispenses stored in the memory of the controller, g) operating the stepper motor by the reduced number of steps, h) weighing the container and the actual amount dispensed in part (g);

i) repeating parts (d) through (h) until a final amount of the ingredient has been dispensed into the container that is within an allowed tolerance for the ingredient.

Another powder ingredient dispenser is disclosed which comprises a scale, the scale linked to a controller, the controller comprising a memory with a plurality of formulas, each formula comprising n amounts of n ingredients, wherein n is an integer; the controller selectively linked to a plurality of pairs of screw pumps by an activator, each pair of screw pumps coupled to a separate reservoir containing one of said ingredients, each pair of screw pumps comprising a large screw and a small screw, the controller being linked to a user interface, the controller being programmed to receive an instruction from a user interface to execute the dispensing of one of said formulas, and upon receiving said instruction, the controller carrying out a sequence comprising a) selecting a target amount of an ingredient to be dispensed into a container;

b) defining an upper limit for a calibrated dispense of the ingredient by the large screw and an upper limit for a calibrated dispense by the small screw;

c) (i) if the target amount is greater than the upper limit for the large screw, operating the large screw to dispense an initial amount of the ingredient into the container that is less than the target amount and until a remaining amount remains to be dispensed to reach the target amount and wherein the remaining amount is less than the upper limit for the large screw, (ii) if the target amount is less than the upper limit for the large screw but greater than the upper limit for the small screw, carrying out parts (d) through (h) using calibration data for the large screw, and (iii) if the target amount is less than the upper limit for the small screw, carrying out parts (d) through (h) using calibration data for the small screw;

d) weighing the container and the actual initial amount of the ingredient and determining an actual remaining amount needed to reach the target amount, e) calculating a number of steps by the stepper motor needed to dispense the actual remaining amount using calibration data stored in the memory of the controller, f) reducing the number of steps by an overshoot factor determined by historical overshoot data of previous dispenses stored in the memory of the controller, g) operating the stepper motor by the reduced number of steps, h) weighing the container and the actual amount dispensed in part (g);

i) repeating parts (d) through (h) until a final amount of the ingredient has been dispensed into the container that is within an allowed tolerance for the ingredient.

The above methods and apparatuses provide for a faster dispense time for a complex formula from a point-of-sale dispensing machine. Other advantages will become apparent upon reading the following description and appended claims, and upon reference to accompanying drawings.

BRIEF DESCRIPTION OF THE DRAWINGS

For a more complete understanding of the disclosed methods and apparatuses, reference should not be made to the embodiment illustrated in greater detail on the accompanying drawings, wherein:

FIG. 3 is a side plan view of a pump, handle, nozzle and fluid container for a single ingredient as mounted on a rotary turntable, which is only partially shown;

FIG. 4 is a rear perspective view illustrating the pump nozzle which is connected to the fluid container shown in FIG. 3 as well as a supporting frame for the container;

FIG. 5 is a partial bottom view of the fluid container illustrating the port which receives the pump nozzle shown in FIG. 4;

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
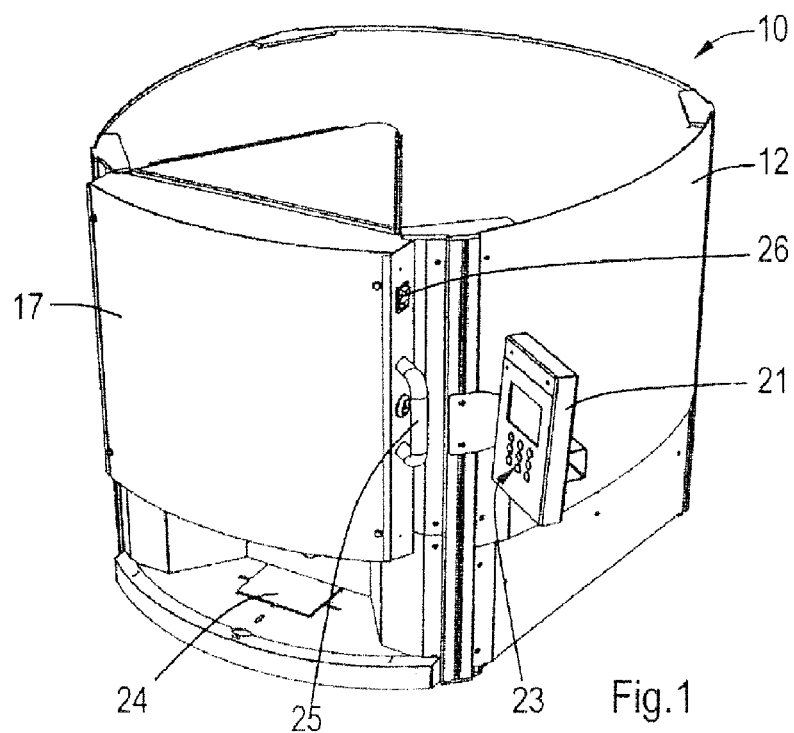
FIG. 1 is a perspective view of a multiple fluid dispensing machine made in accordance with this disclosure.
Figure 2:
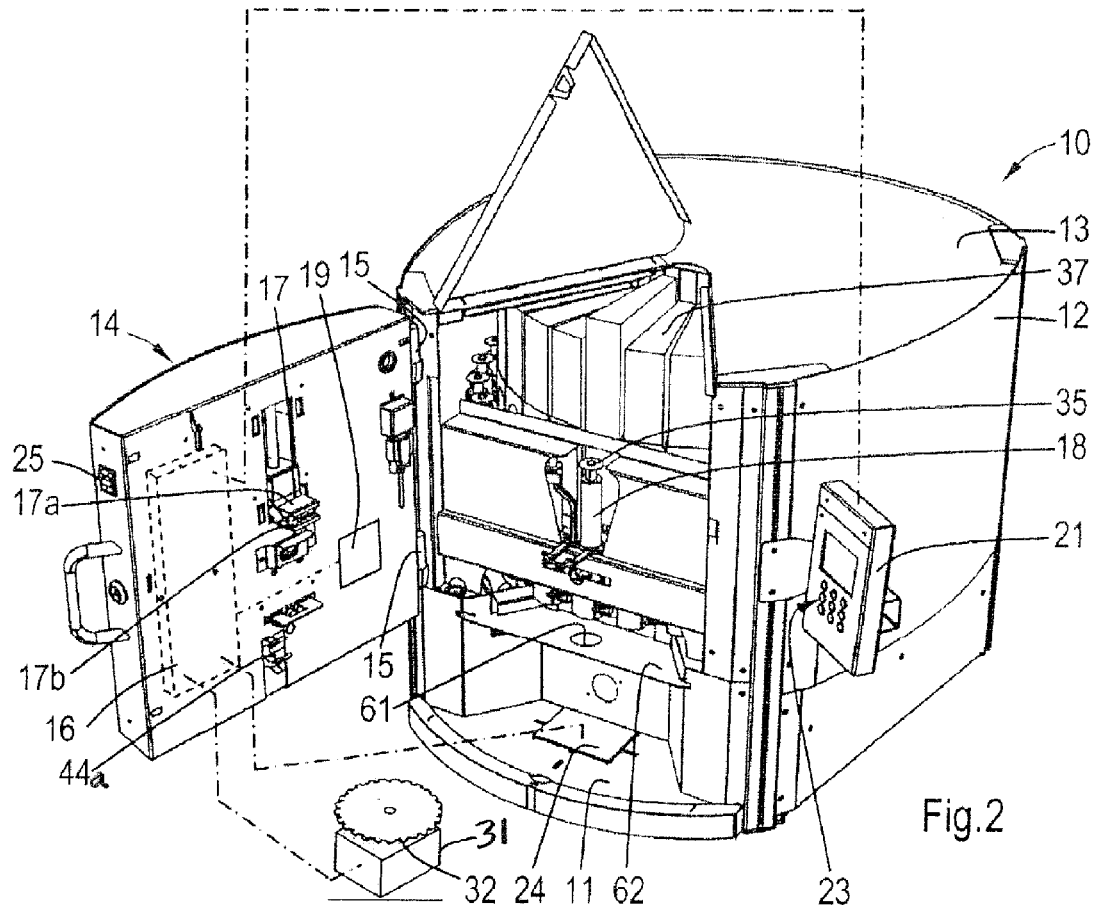
FIG. 2 is another perspective view of the machine shown in FIG. 1 with a front door and top panel in an open position and further illustrating a schematic link between the controller and the motor for rotating the turntable, between the controller and the user interface, and between the controller and the pump activator.

Turning first to FIGS. 1 and 2, an apparatus 10 for dispensing a plurality of different fluids, such as components of hair dyes, paints, paint colorants, nail polish, shampoos, foundations, medicaments and other multiple component liquids is illustrated. The disclosed apparatus 10 can be used for dispensing numerous recipes of these types of products and, because of its compact and aesthetically pleasing design, can be located in a retail environment, such as hair salons and spas.

The apparatus 10 includes a base 11, one or more side panels 12 and one or more top panels 13. A front door is also provided which pivots to the open position shown in FIG. 2 by way of the hinges shown in 15. The door 14 serves as a housing for a controller shown in phantom at 16 as well as an actuator 17 that is used to operate the pumps shown at 18. The actuator 17 may be moved by a stepper motor shown in phantom at 11.

It will be noted that the pumps 18 are mere examples and, as this disclosure also directed to the dispensing of all flowable materials, including powders. Thus, while piston pumps 18 are shown in the figures, conveyors, such as impeller or auger-type devices are also within the scope of this disclosure. Essentially, any delivery device operable by a motor or stepper motor that can be controlled by a computer or controller 16 can be used as a "pump." Therefore, hereinafter and in the appended claims, the term "pump" means conventional pumps of all types (e.g., piston, gear, nutating, diaphragm, metering etc.), as well as impeller or auger-type devices which are referred to as metering pumps in FIGS. 8-14 below and any device capable of being controlled and delivering a flowable material.

The apparatus 10 also includes an interface 21 that includes a screen 22 and keypad 23. Also shown in FIGS. 1 and 2 is the scale 24 that is operatively linked to the controller 16. The door 14 may also include a handle 25 and power switch 26.

Turning to FIG. 3, the embodiment illustrated utilizes a rotary turntable 27, which is partially shown in FIG. 3. The turntable 27 rotates about a shaft 28 and, one means for imparting rotation to the turntable 27 can be the employment of a motor 31 coupled to a toothed wheel 32 (see FIG. 2) which can engage the small circumferential slots shown at 33 in FIG. 4. The motor 31 is operatively linked to the controller 16. Of course, other means for imparting rotation to the turntable 27 under command of the controller 16 will be apparent to those skilled in the art.

Returning to FIG. 3, typical piston pumps 18 include a cylinder 34 which accommodates a slidable piston (not shown). A washer or flange 35 is attached to an end of the piston and provides for a means for engagement with the actuator 17 (see FIG. 2). A stop collar is shown at 36 which may also provide a means for sealing the end of the cylinder 34.

When the door 14 is closed, the actuator 17 on the inside of the door 14 engages the flange 35 of the pump that is in the front position, or the position in alignment with the actuator 17. The actuator 17 includes an upper leg 17a and a lower leg 17b with a gap disposed therebetween for receiving a flange 35. In a preferred embodiment, after a material is dispensed by one of the pumps 18, the movement of actuator 17 via the motor 19 empties any material remaining in the cylinder 34 back into his respective container so that there is no residual material left in the pump.

This is the preferred methodology for two reasons. First, the material contained within the containers or bags 37 may be oxygen sensitive and exposure of the ingredient material to oxygen may be limited if the material is returned to its bag after dispensing. Also, by returning the actuator 17 to the position shown in FIG. 2, the actuator 17 is in alignment with the flanges 35 of the pumps 18 while they are in their down or empty position and therefore the actuator 17 allows unobstructed horizontal movement of the pumps 18 and flanges 35, but engages a flange 35 of a pump 18 when the actuator 17 is moved vertically. Upward movement of the actuator 17 causes an intake stroke of the piston and downward movement causes a discharge stroke.

Returning to FIG. 3, the cylinder 18 is mounted on top of a pump housing 38 which contains a valve, such as a ball valve, which can be operated by a lever 41. In the intake position of the lever 41, the cylinder 34 communicates with the container 37 via the connector or nozzle 42 so that the cylinder 34 can be filled with a desired amount of fluid by moving the flange 35 upwards over a desired or predetermined length under the action of the actuator 17 as determined by the controller 16. As soon as the intake stroke has been completed, the valve member is rotated by moving the lever 41 to a dispense position that fluid can be discharged by moving the flange 35 and actuator 17 downwards. Fluid is dispensed out the pump 18 through a nozzle shown at 43. To move the lever 41 from the intake to the dispense position, an additional actuator 44a is provided in the door 14. Also, as noted above, after the dispense is complete and it is desired to discharge any remaining material from the cylinder 34 back into the container or bag 37, the lever 41 is moved back to the intake position and the dispense stroke is completed by lowering the flange 35 and actuator 17 to the fully downward position as the material is evacuated from the cylinder 34 back into its container 37.

Turning to FIGS. 4 and 5, the connector 42 is secured to the pump housing 38 as shown and provides a male connection to the container or bag 37 shown in FIG. 5. With the cap 44 removed, the connector 42 is received within the bag and provides a sealed connection. To remove the bag 37 or container 37 from the connector 42 and pump 18, a lever 45 is provided which includes a frame 46 that engages the corresponding frame 47 on the container 37. Pivotal movement of the lever 45 in the downward direction causes upward movement of the frame 46 which engages the flange 47 of the container 37 which acts to dislodge the container 37 from the connector 42.

To hold the container 37 in place, a suitable holder 51 is provided with front and rear walls 52, 53. The holder 51 is secured to the turntable 27 as shown in FIG. 4. The holder 51 also provides a pivot for the lever 45 and frame 46.

Figure 6:
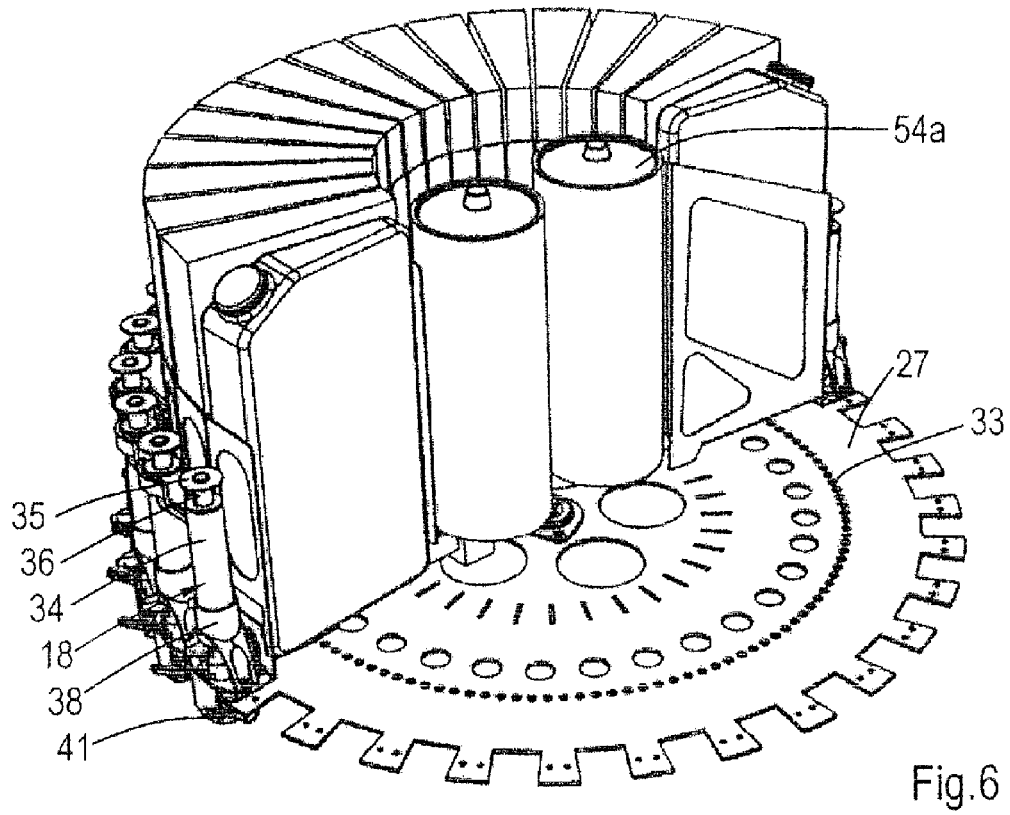
FIG. 6 is a partial perspective view of a plurality of pumps and containers mounted on a rotary turntable made in accordance with this disclosure.
Figure 7:
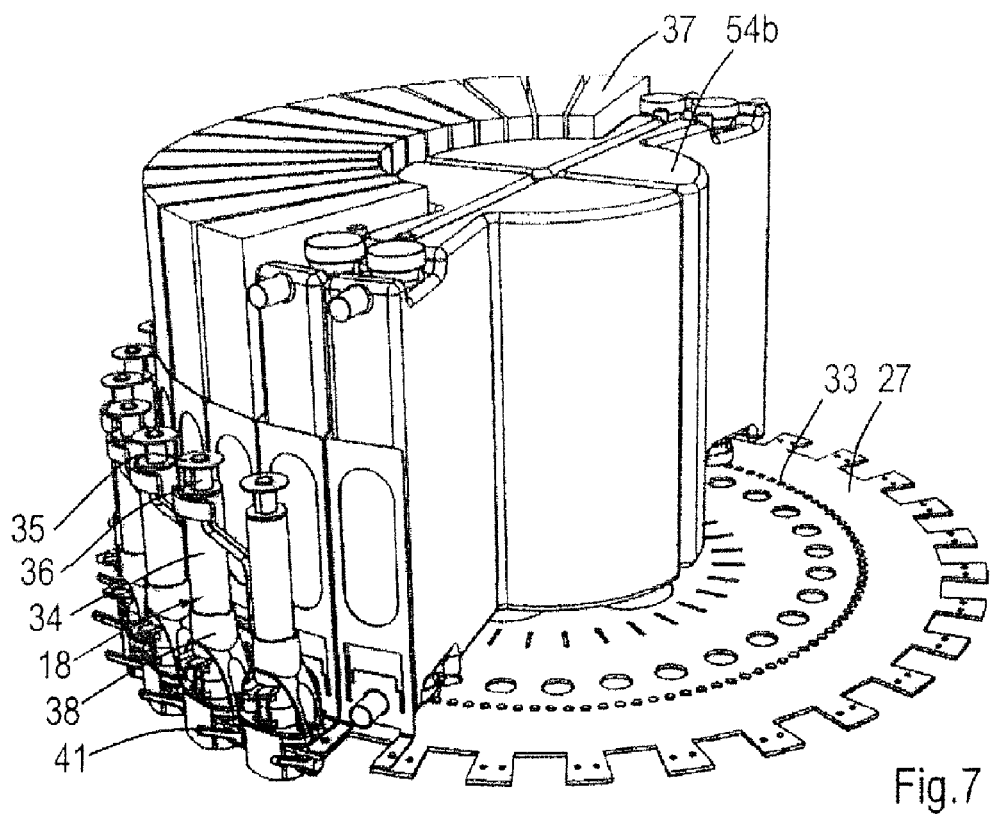
FIG. 7 is a partial perspective view of a plurality of pumps and containers of an alternative design mounted on a rotary turntable made in accordance with this disclosure.

FIGS. 6 and 7 illustrate a few alternatives for the arrangement of the various containers 37 shown in FIGS. 2 and 3 and larger containers 54a and 54b as shown in FIGS. 6 and 7. The larger containers 54a, 54b can be used for voluminous ingredients of a formula, such as developer for hair dyes or base material for cosmetic or paint applications. As shown in FIG. 6, two of the larger containers 54a may be employed or, as shown in FIG. 7, four of the larger containers 54b may be employed. Other various arrangements including a single larger container or more than four larger containers or an odd number of larger containers can be easily accommodated for and will be apparent to those skilled in the art.

Figure 15:
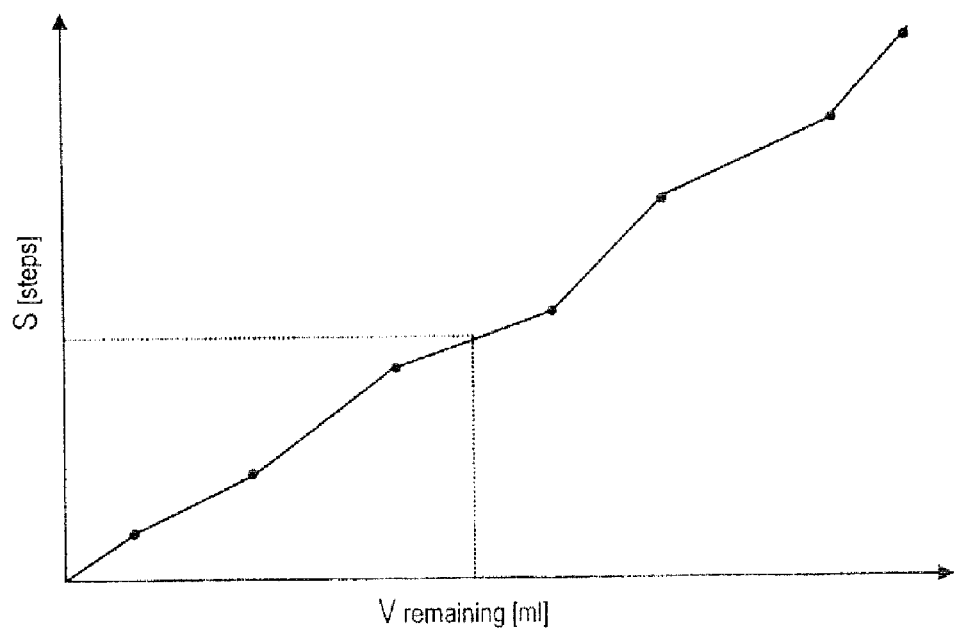
FIGS. 15 and 16 illustrate the use of calibration charts or formulas in accordance with the disclosed methods.
Figure 16:
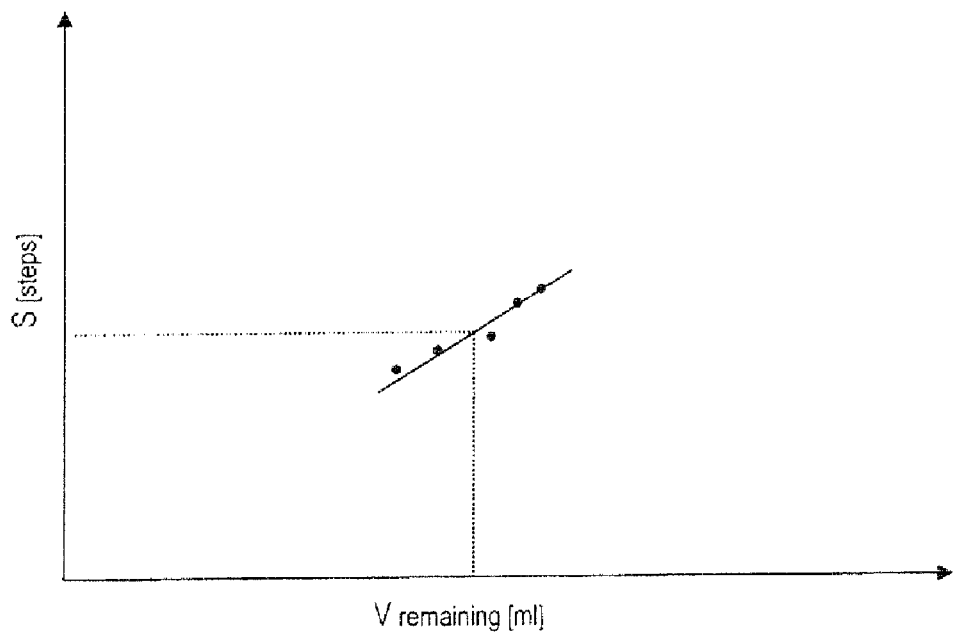
Figure 17:
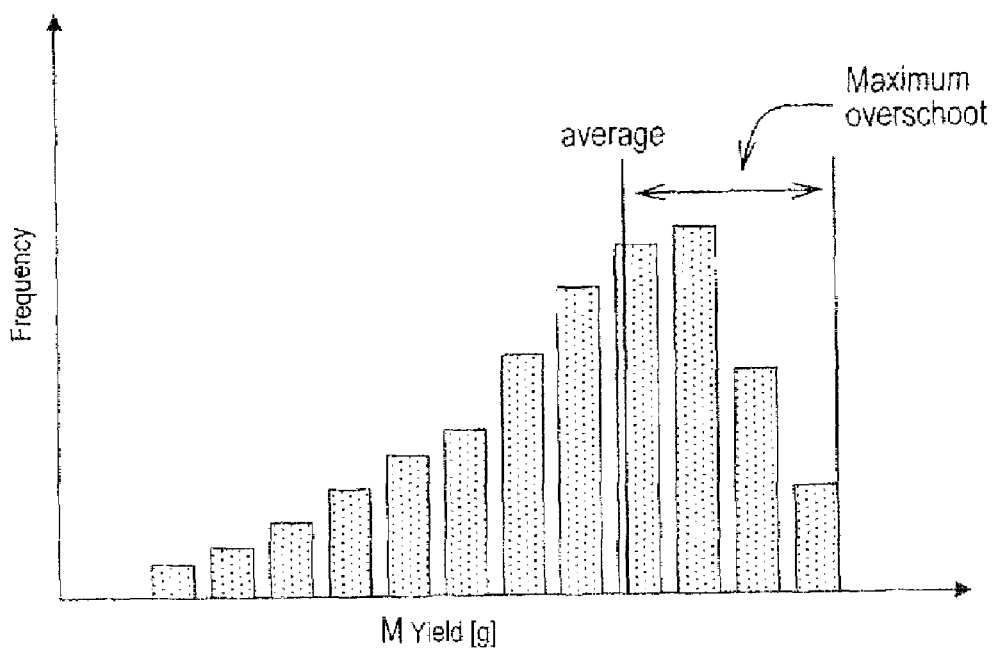
FIG. 17 is an exemplary dispense system yield histogram for a screw-type powder dispenser.

Referring back to FIG. 1, it will be noted that the scale 24, the motor 31, the actuator 44a and the actuator 17 are all linked to the controller 16. The controller 16 is also operatively linked to the interface 21. With this communication in mind, attention is now directed to the improved dispensing method, one embodiment of which is illustrated in FIGS. 15-17 below.

Figure 8:
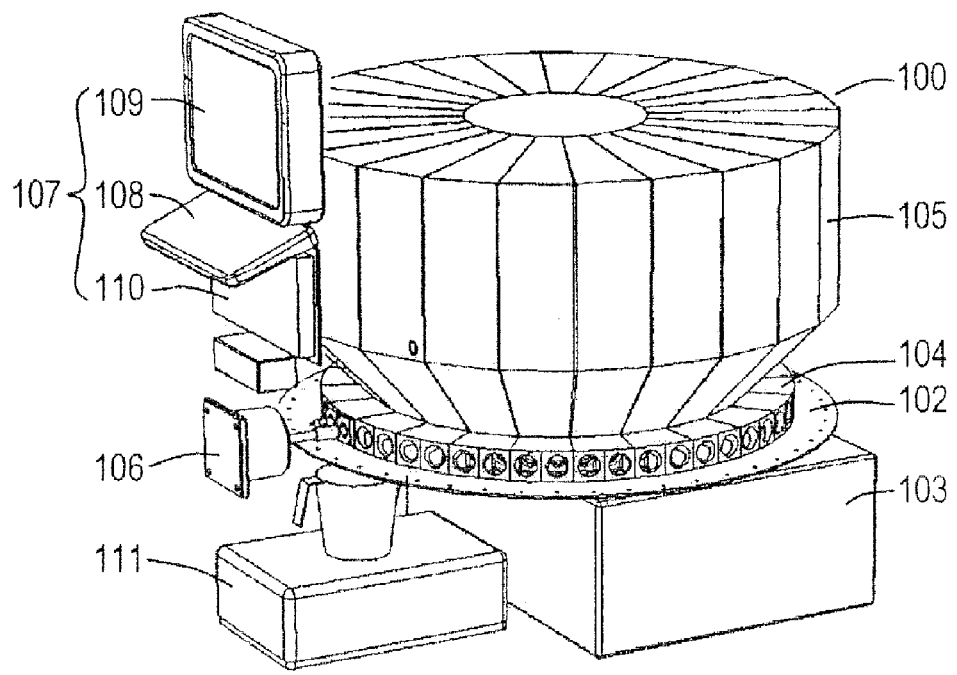
FIG. 8 is a perspective view of an apparatus for dispensing powders.

Turning to FIG. 8, an apparatus 100 for dispensing a plurality of powders, such as pigments for compounding paints, dyes, caulking or grout or components of cosmetics, e.g. foundations is disclosed. The apparatus 100 can be used for numerous paint or cosmetic recipes and can be located e.g. at a retailer, a spa or at a body repair shop for cars.

This particular dispensing apparatus 100 is an automated version and includes a horizontal turntable 102, mounted on a support 103 and carrying, along its circumference, a plurality of metering powder pumps 104 and twenty-four containers 105 for the powders. The turntable 102 can be rotated about a vertical, central axis by means of a motor inside the support 103 and between discrete positions, in this case forty-eight positions (two for each container as will become apparent below) including a front or dispensing position provided with a stepper motor 106 for driving one of the pumps 104.

The apparatus 100 further comprises a control device 107 comprising a small keyboard 108 for entering information, such as client data and paint recipes, and a display 109. The control device 107 also comprises a computer or controller 110 for storing the said information and for driving the turntable 102 and the stepper motor 106.

A weighing device 111, comprising an upper plate on which a cup or other receptacle can be placed and a load-cell (hidden from view and known in itself), is located beneath the pump 104 and the container 105 that are in the dispensing position. Optionally, a dispenser (not shown) for cups or other receptacles can be provided, especially when the apparatus 100 is being employed for dispensing components of cosmetics.

Figures 9, 10:
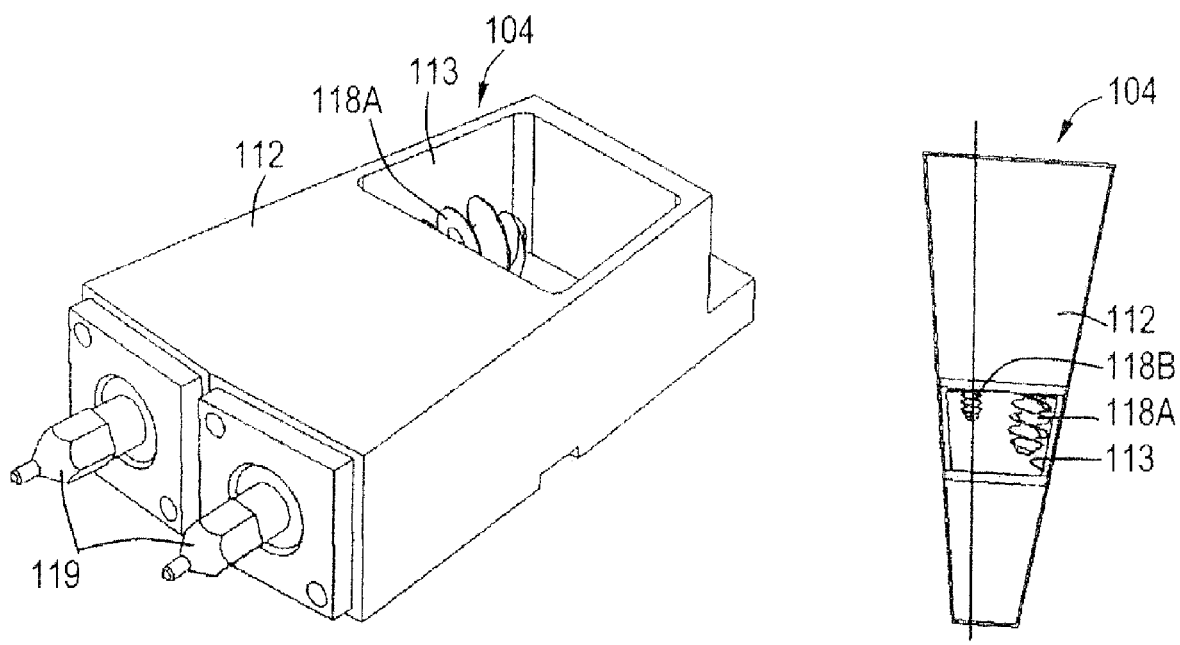
FIG. 9 is a perspective top view of a metering pump used in the apparatus of FIG. 8.
FIG. 10 is a further top view of the said metering pump.

As can be seen in FIGS. 9 and 10, each of the metering pumps 104 comprises a housing 112 having a inlet chamber 113, with an inlet opening facing upwards and positioned beneath a container 105, and a polycylindrical bore (shown in cross-section in FIGS. 11 and 12) leading to an outlet chamber 114 facing downwards and, during dispensing, positioned over a receptacle 115. A lid 116 is pivotally mounted on the housing 112 for closing the outlet chamber 114.

Figure 11:
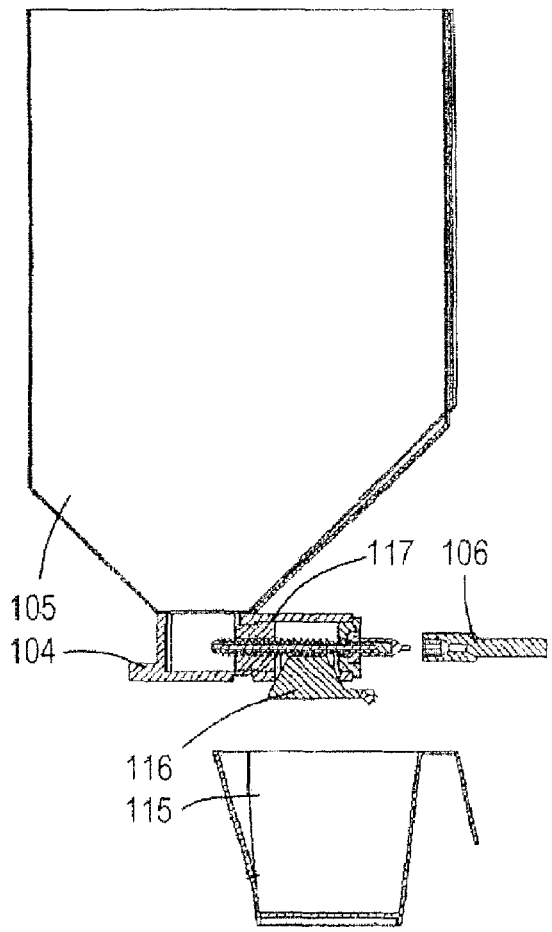
FIGS. 11 and 12 are cross-sectional side views of a container and metering pump used in the apparatus of FIG. 8.
Figure 12:
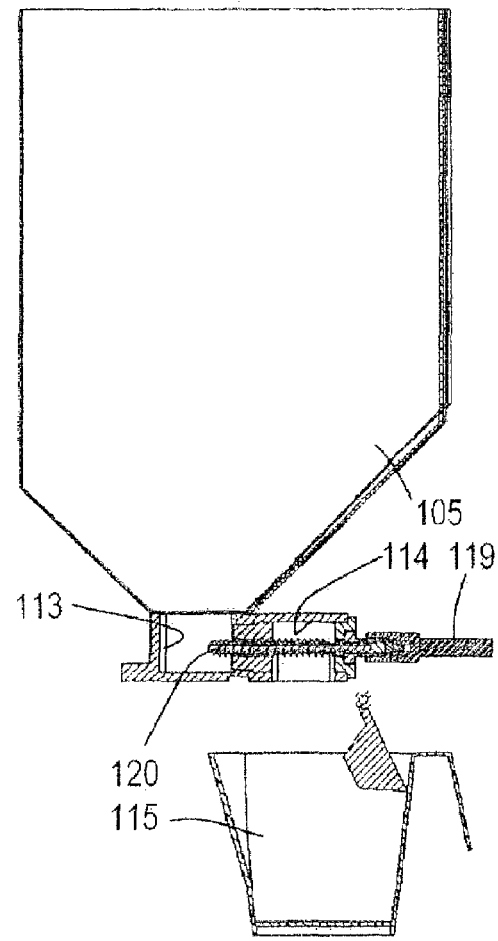

As shown in FIGS. 11 and 12, inserts 117 are mounted, e.g. by means of an external screw thread, in the channel between the chambers 113, 114. These inserts 117 are provided with axially extending pump chambers, which accommodate two concave profile screws, impellers or augers 118A, 118B of different sizes and which can be readily replaced, e.g. when a different type or size of screw is to be fitted.

In this example, the screws 118A, 118B extend radially with respect to the turntable 102. The relatively large screw 118A has a diameter of 22 mm and a double pitch of 12 mm, yielding a dispensed volume for each revolution of 735 mm$^3$, whereas the relatively small screw 118B has a diameter of 8.5 mm and a double pitch of 7 mm, yielding a dispensed volume for each revolution of 35 mm$^3$. First ends of the screws 118A, 118B, extending away from the central vertical axis of the turntable 102, are each provided with an adaptor 119 which is to be engaged by the stepper motor 106, as will be explained in more detail below. Further, each of the screws 118A, 118B is made of polypropylene (PP) or polytetrafluoroethylene (PTFE) reinforced with a cylindrical metal rod 120.

In order to further improve the dispensing accuracy of the screws 118A, 118B, the effective outer diameter of the screws 118A, 118B is in excess of the effective inner diameter the respective channel. The rim of the screw is at least partially bent in the displacement direction of the pump. Such bending can be achieved by simply inserting the oversized screws in the channels from the outlet side towards in the inlet side.

In an alternative embodiment, which is especially suitable for fragile powders, the effective outer diameter of the screw is smaller than the effective inner diameter of the respective channel, resulting in clearance between the screw and the channel, and wherein the screw is provided with bristles that bridge this clearance. This type of screw was found to be effective in reducing the forces exerted on the powder.

As illustrated in FIGS. 11 and 12 during the dispensing of a particular recipe, e.g. consisting of powders to be dispensed and mixed in a cup or consisting of a base material into which one or more powders should be dispensed, the turntable 102 is rotated about its vertical axis until the container 105 with the required powder is in the dispensing position. Subsequently, the lid 116 is opened (see FIG. 12) and, depending on the amount to be dispensed, the large screw 118A, which a particular powder having a density of, say, 0.57 g/cm$^3$ dispenses 0.42 g for each revolution, or the small screw 118B, which dispenses 20 mg for each revolution, is selected.

The accuracy of the screws can be further enhanced by calibrating, relative to a reference or zero position of the screw, the dispensed amounted in several positions within one revolution, e.g. for each step of 30 degrees yielding a total of 12 steps in one revolution. By calibrating for several positions, any non-linear effects can be taken into account. These effects dependent inter alia on the dimensions and material of the screw and on the powder that is being dispensed. In some cases, the screw will dispense relatively small amounts or not dispense at all during e.g. two or three steps and then dispense a relatively large amount in the fourth step, which phenomenon could be referred to as "pulsing". Many of these effects were found to be sufficiently regular to allow compensation by calibration.

In addition to use during dispensing, the above-described weighing device 111 can also be used to calibrate one or more of the pumps 104 as discussed with respect to FIGS. 15 and 16 below.

Once dispensing of a particular powder has been completed, the lid 116 is closed and the turntable 102 is rotated until the next required container 105 is in the dispensing position. Closing the lid 116 prevents powder from falling out during rotation. In an alternative embodiment, the screws that have just been used are revolved in reverse direction prior to rotation of the turntable thus drawing the powder back into the metering powder pump.

Figures 13, 14:
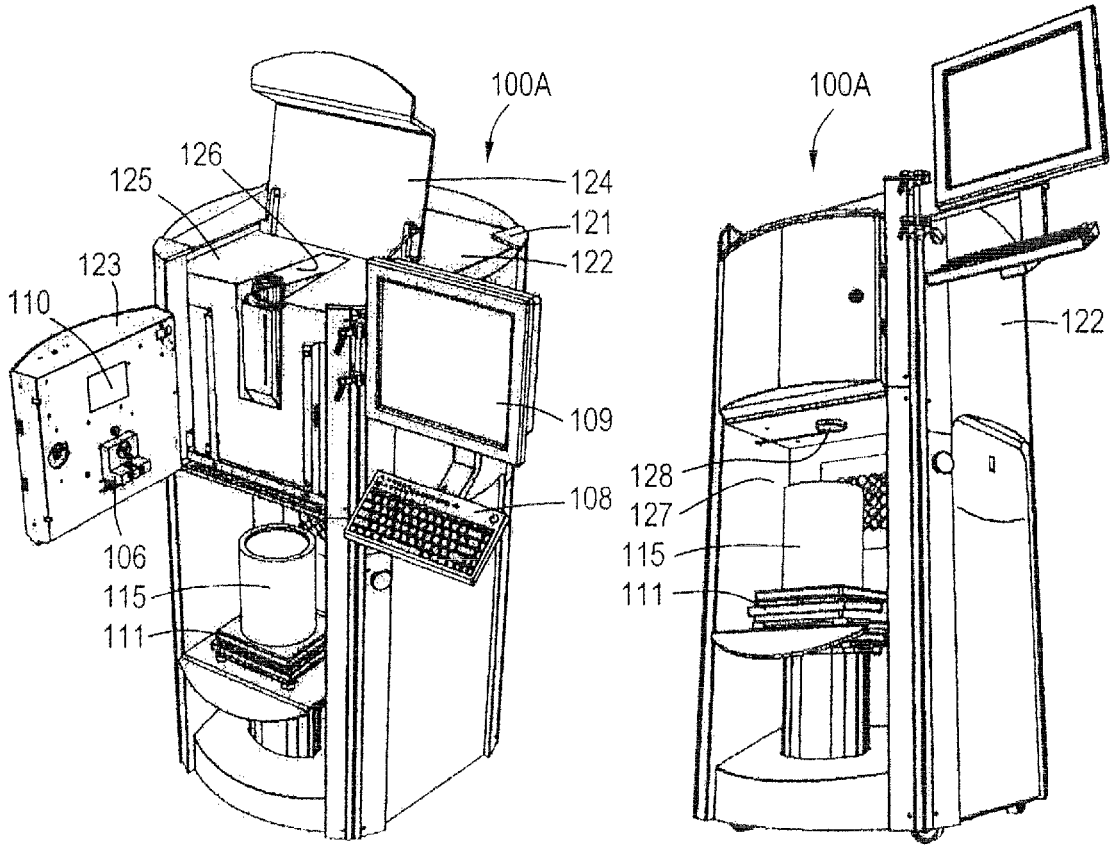
FIGS. 13 and 14 are perspective views of a second apparatus for dispensing powders comprising several additional features.

FIGS. 13 and 14 show a second embodiment of an apparatus 100A for dispensing powders comprising several additional features. This second embodiment comprises substantially the same components as the embodiment described above, including a horizontal turntable 102, with a plurality of metering pumps 104 and containers 105, mounted along its circumference as shown in FIG. 8. The turntable 102 can be rotated between discrete positions, in this example, forty-eight positions including a front or dispensing position (marked in FIG. 6 by a single exposed container), about a vertical, central axis by means of a drive (not shown). The apparatus 100A includes a frame of e.g. aluminum extrusion profiles 121 to which sheets 122 of metal or a polymer (transparent, translucent or opaque) have been attached by means of e.g. screws. A control device comprising a display 109 and a keyboard 108 for entering information, such as customer data and recipes, is mounted on the right hand side of the frame, next to a door 123. This door 123 contains a computer 110 for storing the said information and for driving the turntable 102, actuators, including a stepper motor 106, for operating the pumps 104, etc. A weighing device 111 is positioned below the door 123 in a space where a container 115 or the like for receiving powders dispensed by the apparatus 100A can be placed.

A substantially rectangular hatch 124 is pivotally mounted, along one of its rims, in the top sheet 122. Further, a metal coversheet 125 is present below the hatch 124. The coversheet 125 comprises an opening 126 that corresponds in shape to the shape of the containers 105 and which consequently allows access to only one container 105 at a time.

A ventilation unit is located below the turntable, which comprises a grille 127 and which will remove airborne powder. Further, an ionisation device 128 (e.g., a Static Eliminator AD1683EX, available from A&D Company, Ltd., Tokyo, Japan) is provided near, preferably around the dispensing opening of the pump 103 of the container 4 in the dispensing position. This ionisation device 128 serves to reduce or even neutralise electrostatic charges in the material that is being dispensed, thus preventing this material from adhering to the pump 104 or other parts of the dispenser 100A and improving the accuracy with which the powder is dispensed.

The dispensing methods will now be described. For each apparatus above, including the apparatus 10 intended primarily for liquid ingredients and the apparatuses 100, 100A intended primarily for powder ingredients, and hybrid machines capable of dispensing liquids and powders, the disclosed algorithm dispenses a primary amount that approaches the target amount for an ingredient and then the remaining amount needed to reach the target is dispensed in two parts, referred to as halves, even though the second part or second half includes an adjustment, based upon the actual amount dispensed by the pump 118A, 118B, 104 for the first part or first half.

This procedure takes advantage of the concept that the output variance of any device, such as a pump, is smaller and more consistent in the short term or for small outputs. So, for any particular ingredient that requires accuracy, the bulk of the dispense, short of the target amount, is carried out and weighed. The remaining amount is calculated and divided, preferably by two (2). The first part of the remaining amount, or the first half, is dispensed and weighed. The difference between the weighed amount (actual amount) for the first half and the calculated or intended amount for the first half is used to build in a correction for the second part or second half. In an embodiment, this error or difference is doubled and added to the second half. If the weighed or actual amount for the first half is too high, the second half is proportionately reduced to correct for the first half as well as the second half; if the actual amount for the first half is too low, the second half is proportionately increased to correct for the first half as well as the second half. Thus, the correction for the first half and the projected correction for the second half are made at the same time.

If a piston pump is used, the initial dispense preferable leaves a volume of less than two full piston strokes. Again, the objective is to take advantage of the fact that the output variance of any statistical process (including a dispense process) is much smaller in short term than in long term. This fact is known from the statistical process analysis (e.g., six sigma (σ)). Experimental measurements have shown that the mean of any given process will tend to shift +/−1.5 σ over time. As a result, a short term samples will have a 1.5 σ smaller variance than sample populations gathered over longer long term periods.

The general dispense process for a piston pump (as well as a metering pump) may be as follows:

A. Divide the target amount into an initial dispense (70-95% of the target) and a remaining amount that is smaller than two pumps strokes (or two rotations of a metering pump screw);

B. Carry out the initial dispense and measure the output;

C. Calculate the remaining desired amount needed to reach the target and divide the remaining amount by a factor, e.g., by two to divide it into two halves or a number greater than two, e.g., by three to divide it into thirds;

D. Calculate the number of pump steps or a motion of the pump for the first 'half' from the data in the calibration table or a calibration formula stored in the memory of the controller;

E. Dispense the first half and weigh the actual first half output;

F. Establish a differential between the expected first half amount and actual of the first half amount;

G. Adjust the second half amount (which is often the same as the intended first half amount) by double this differential (once for the dispense of the first half, and once again to compensate for the expected deviation in dispense of the second half);

H. Calculate the steps or a motion of the pump needed for the "adjusted" second half, dispense verify the actual second half output When the actual output is more than the allowed upper limit tolerance, the dispense is rejected, when the actual output is less than the lower limit tolerance, the missing amount is dispensed (typically in one go when the amount is smaller than 0.1 ml or <0.5 mg).

When the remaining amount (after the initial dispense) is larger than two full pumps strokes for a piston pump or two rotations of a metering pump, a number of full pump strokes or rotations is preferably dispensed first until the remaining amount can be dispensed in two pump strokes or two rotations. To save time, the verification of actual output by the scale only has to take place after all full strokes have been completed. The desired (remaining) dispense output ($V_{remaining}$) is preferably divided into two equal halves ($V_{remaining}/2$). The required piston movement to realize $V_{remaining}/2$ is established using a dispense yield memory table or calibration table stored in the memory of the controller or other suitable memory device.

In the calibration table (shown in the form of a graph in FIG. 15), the number of stepper motor steps S is plotted against the desired amount $V_{remaining}$ for previous dispenses. This calibration table of FIG. 15 stores the long-term relationship data between stepper motor steps S and amounts V. When $V_{remaining} - V_{actual}$ is smaller than a certain threshold amount (typically 0.1 ml) the dispense need not be divided into two halves but can dispensed in one step.

With every dispense of a first half, where $V^1_{remaining} = V_{remaining}/2$, the number of steps is estimated using a linear equation $S_1 = A*V^1_{remaining} + B$. The coefficients A (slope) and B (y-intersect) are estimated from the calibration table using a least square method on a set of N nearest points. A typical value for N is 5 as shown in FIG. 16. N may vary from liquid to liquid and may be very different for powders as opposed to liquids.

The actual yield from the "half" dispense of $V_{remaining}/2$, as measured by the scale ($V^1_{actual}$), is used to predict the yield for the second "half" dispense. The second "half" dispense will need to be adjusted such that the deviation in the dispense of the first "half" (i.e., $V^1_{remaining} - V^1_{actual}$) is compensated for as well as the expected deviation for the second "half" dispense. The missing or superfluous amount that occurred during the first dispense action (i.e. $V^1_{remaining} - V^1_{actual}$) is likely to occur during the dispense of the second "half" is assumed to be approximately as big as the deviation that occurred in the first 'half'. Thus, using the previously established linear relationship, $S = A*V^1_{remaining} + B$, piston travel ($S_2$) is now calculated the second half, $S_2 = A*V^2_{remaining} + B$, where $V^2_{remaining} = V^1_{remaining} + 2*(V^1_{remaining} - V^1_{actual})$. Preferably, the dispense of the first half is not yet added to the calibration table and the calibration table is updated after the second dispense.

The calculated piston travel ($S_2$) is now used to perform a dispense action and the end result $V^2_{actual}$ is measured.

After the second half dispense (the third dispense in all), the actual and desired outputs are compared ($V^2_{remaining} - V^1_{actual}$). When the actual output does not fall within the specified tolerances the missing amount has to be dispensed.

When the remaining $V^2_{remaining}$–actual is smaller than a certain threshold (typically 0.1 ml or 0.5 mg) the missing amount is dispensed in one dispense action, otherwise the procedure for a $V_{remaining}$ is carried out as set forth above.

A typical calibration table (FIGS. 15 and 16) contains 50 data points or more. The calibration table is preferably updated automatically with every dispense cycle. Every new dispense add a new co-ordinate ($V_{remaining}$, S) to the table and the oldest coordinate may be deleted according to the so called First in First out principle (FIFO). Without additional measures this approach can lead to a situation where the calibration table is unevenly distributed when a large series of 'close together' dispenses is carried out. Therefore the calibration table is divided into typically 10 segments where the FIFO principle is used per segment. This approach ensures that the calibration points remain evenly distributed over the capacity range of the pump. The number of segments and segment size are configurable depending upon accuracy requirements and application.

Initially (when the dispenser has never been used before) a calibration procedure will need to be perform a series of (random) dispenses to fill the calibration table. Alternatively the calibration table can also be filled with the theoretically expected output, multiplied by a safety factor (e.g., 0.9). This will make the system somewhat slow in the beginning (because extra dispense cycles are needed to get the desired output), but it will make a calibration procedure unnecessary. Properties of data recording like recording capacity, distribution of measurements over range etc. are configurable.

While dividing the remaining amount by two (2) to create first and second half amounts is preferable for speed purposes, the remaining amount may be divided into thirds, fourths, fifths, or even non-equal portions. The important point is for the "error" made in the first or one remaining amount dispense to be applied to a second or successive remaining amount dispenses.

Next, an algorithm is described that is particularly use for dispensing of powders and/or granulates (referred to as powders in the rest of this document) using a multiple lead screw dispensing system having feedback from a scale. The particular algorithm ensures that a desired amount of powder is dispensed within prescribed tolerance limits (upper and or lower) with as little iteration cycles as possible.

The dispensing of powders can be more difficult than liquids. This is primarily caused by two phenomena. First, the density (amount of material per unit of volume) of a powder can vary greatly with the particle size and compaction. Second, the yield of a lead screw dispensing system varies with the "flow properties" of the powder (i.e. particulate size, particulate shape and particulate surface friction). Due to these two phenomena, the existing dispense algorithms for gravimetric feedback of liquids do not function correctly. The short term variation in a powder dispense system yield is too large to rely on short term repeatability as is done in the gravimetric algorithm for liquids.

A disclosed algorithm dispenses powders in an iterative approach. An example of a distribution of the system output is shown in FIG. 17. Sometimes the system output is below average, sometimes above average. To avoid over-dispensing and a rejected dispense, the algorithm uses a safety margin. The safety margin is established using the recorded historical maximum overshoot as shown in FIG. 17. This safety margin is recalculated per dispense using a subset of the recorded history. This is described in greater detail below. The disclosed mechanism makes the algorithm self-learning.

Figure 18:
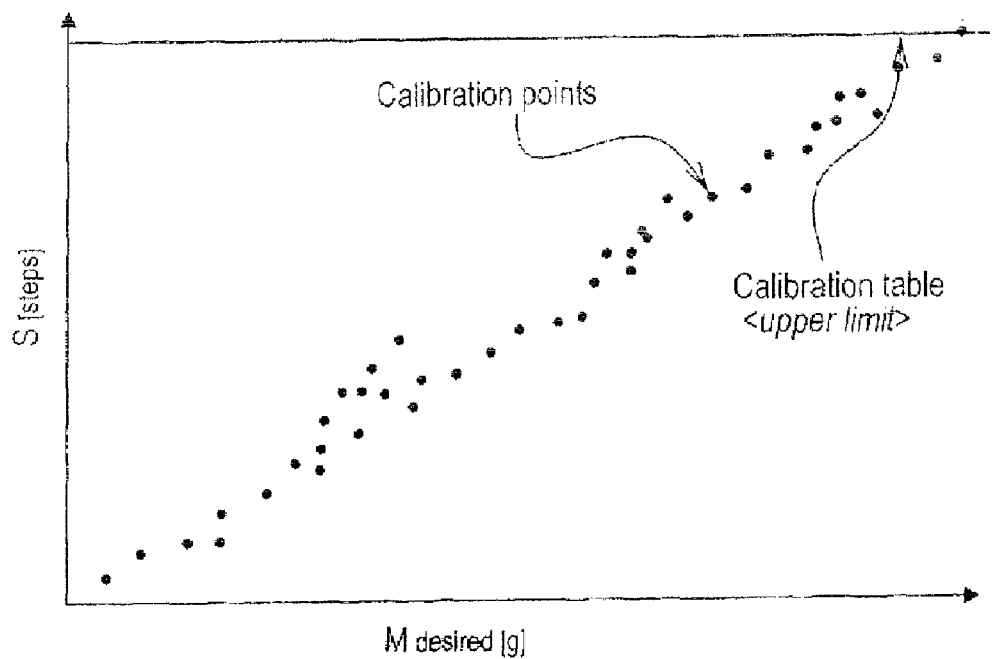
FIG. 18 is an exemplary calibration graph or table for a screw-type powder dispenser.

To illustrate a dispense cycle, it will be assumed the system has generated a set of dispense results with the number of steps and the associated powder output mass. The set of collected points (number of steps, mass of powder output) is called the "calibration table and is illustrated in FIG. 18. FIG. 18 covers a range between 0 steps and 0 mass output and a predefined <upper limit>.

Figure 19:
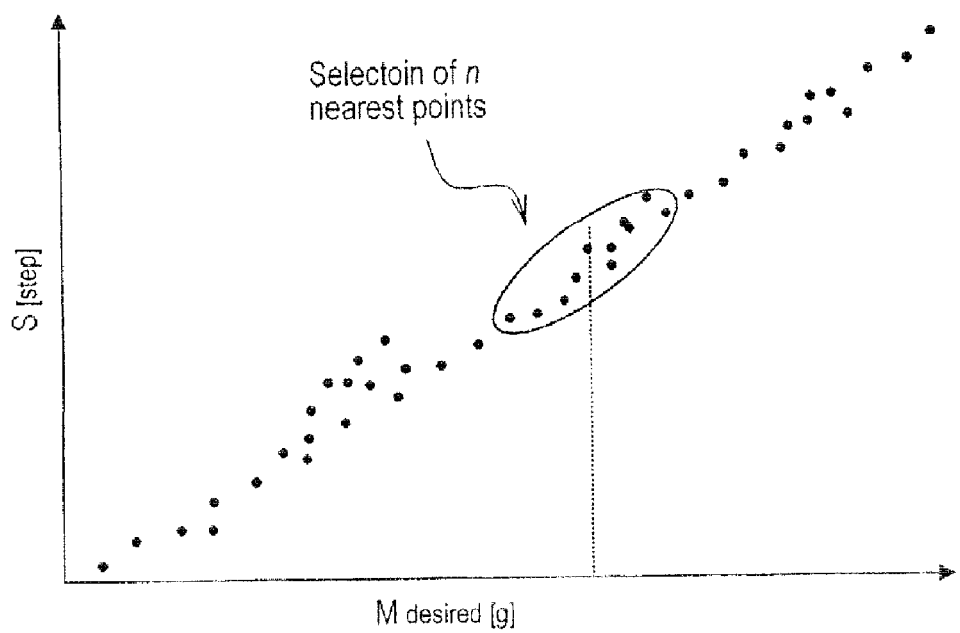
FIG. 19 graphically illustrates the selection of a cloud or set of data points for a screw-type powder dispenser that surround the desired output $M_{desired}$.
Figure 20:
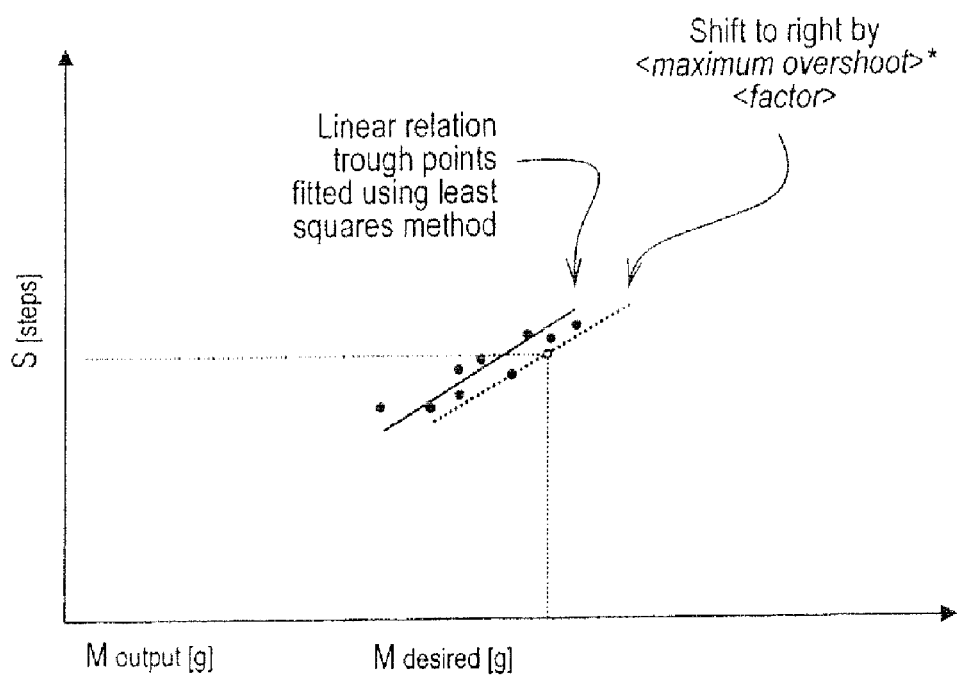
FIG. 20 graphically illustrates a linear approximation of the number of steps need to dispense $M_{desired}$ using a subset or cloud of calibration data points and a reduction in the number of steps by <maximum overshoot> safety factor.

Before every dispense, action the algorithm will select a subset or a "cloud" of the n nearest points in the neighborhood of the desired output mass as shown in FIG. 19. Within the cloud of points of FIG. 19, the algorithm will construct a linear relationship between output and number of steps needed to reach the desired output. Also the safety "shift," i.e. the reduction to avoid and over-dispense, is calculated from this cloud of points. The safety shift is defined as the maximum overshoot multiplied by a safety factor and is illustrated in FIG. 20. This safety factor is a general system setting. The more historic points are stored in the system, the smaller the safety factor can be. To avoid very slow dispensing following a stray measurement, the system limits the safety shift to an adjustable absolute <maxshift> value.

Depending on the properties of the powder and the desired accuracy tolerances, the above described powder algorithm requires three to four iteration cycles to reach target. A typical powder dispensing system contains two (or more) lead screws including a large screw or impeller and a small screw or impeller. The lead screws are dimensioned such that yield per step is significantly different to obtain a high dispense accuracy.

The data sets used in the powder algorithm (FIGS. 18-20) are specific for each lead screw, which in turn are typically dedicated to a single powder as shown in FIGS. 8-12. Within each dispense cycle, the algorithm will use the lead screw (and corresponding data set) where the <upper limit> is larger than the requested amount. When the requested amount is larger than the table upper limit. The amount will be split-up the dispense in a multiple cycles of <upper limit> amounts.

Preferably, the algorithm automatically updates the calibration tables for the lead screws.

Figure 21:
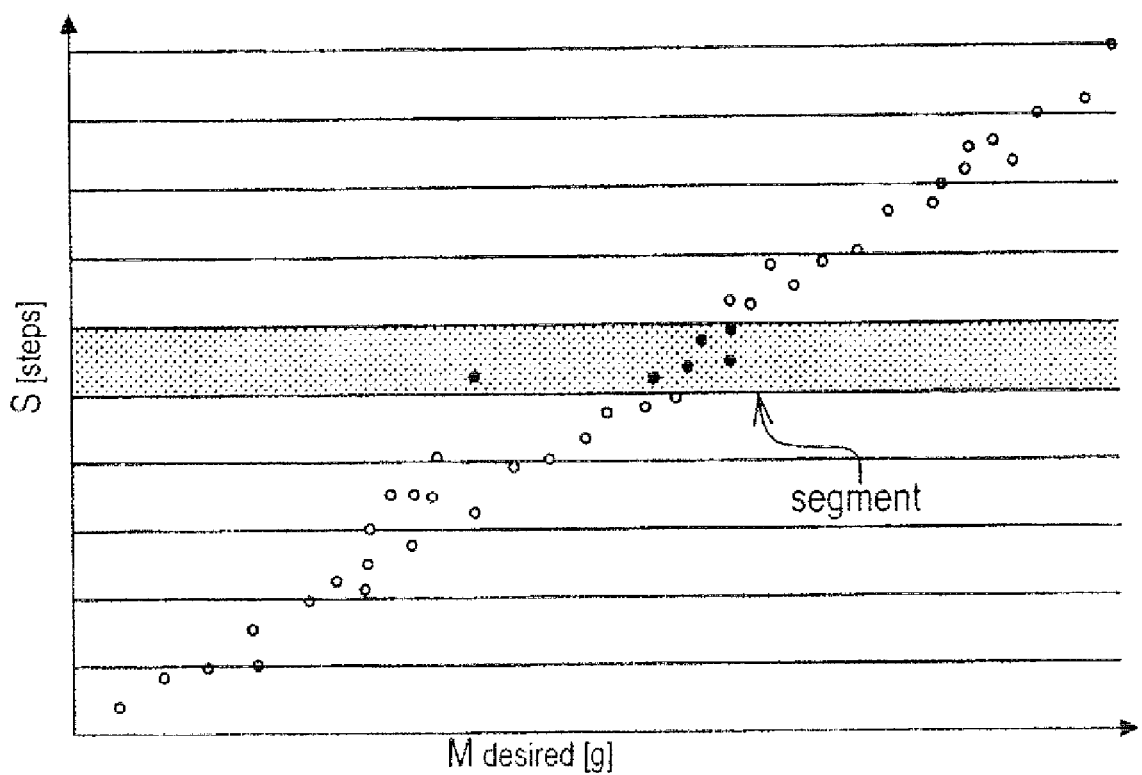
FIG. 21 graphically illustrates the division of a calibration data table into discrete segments and the application of the FIFO principle to individual segments.

The calibration table may typically contain 100 points. The calibration table may be updated with every dispense cycle. Every new dispense add a new co-ordinate ($M_{dispensed}$, S) to the table and the oldest coordinate will be deleted according to the so called First in First out principle (FIFO). Without additional measures this approach can lead to a situation where the calibration table is unevenly distributed when a large series dispenses of similar amounts (e.g., 5 g) is carried out. To address this issue, the calibration table may divided into a plurality of segments, e.g., 10 segments as shown in FIG. 21, where the FIFO principle is used on a per segment basis. This approach guarantees that the calibration points remain evenly distributed over the capacity range of the pump. The number of segments and segment size are configurable depending upon accuracy requirements and application.

Initially, when the dispenser 100 has never been used before, a calibration procedure will need to be performed. In this procedure a series of (random) dispenses is carried out to fill the calibration table. Alternatively the calibration table can also be filled with the theoretically expected output, multiplied by a safety factor (e.g. 0.9). This will make the system somewhat slow in the beginning (because extra dispense cycles are needed to get the desired output), but it will make an initial calibration procedure unnecessary. The later procedure may be preferable when the powders being dispensed are costly or must be kept in a sanitary condition.

Therefore, another general dispense routine may be summarized in the following steps:

A. When the requested amount is larger than the <upper limit> (see FIG. 18), as many cycles of <upper limit> are dispensed until the remaining amount is smaller than <upper limit>.

B. Select the lead screw that has the smallest <upper limit> that is still larger than the requested (remaining) amount.

C. Select a cloud of <n> nearest points from the calibration table around the requested amount (FIG. 19).

D. Construct a linear equation from the cloud of points using the least squares method (FIG. 20).

E. Calculate the maximum overshoot from the cloud and shift the linear equation by a <safety factor>*<maxovershoot> to the right (FIG. 20).

F. Calculate the number of steps by substituting the requested amount in the shifted equation. To avoid very slow dispensing following a stray measurement, the system limits the shift to an adjustable <maxshift> value.

G. Dispense the calculated steps and measure the system yield.

H. Store the steps, actual output and requested output in the calibration history table and delete the oldest calibration point in the table segment (FIG. 21).

I. Repeat the above process from step 2 as long as the yield is below the tolerance on the requested amount. The process is aborted (fails) when the yield is higher than the requested amount+allowed tolerance.

While the dispense routines illustrated above are particularly useful for dispensing apparatuses utilizing rotary turntables as illustrated above, the dispense routine is applicable to other devices whereby the ingredient containers move linearly or are stationary such as the apparatus illustrated in application Ser. No. 10/698,923, which is also commonly assigned with the present application.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A method for dispensing a plurality of ingredients of a formula, the method comprising:
   a) selecting a formula calling for n ingredients, with each ingredient having a target amount, wherein n is an integer;
   b) calculating a motion of the pump required to dispense less than the target amount of said one of the n ingredients;
   c) executing a percentage of said motion of the pump required to dispense said less than the amount of said one of the n ingredients;
   d) reading a scale and determining a remaining amount of said one of the ingredients needed to meet the target;
   e) dividing said remaining amount by a factor to calculate a first remaining amount and calculating a motion of the pump required to dispense said first remaining amount;
   f) executing said motion of the pump required to dispense said first remaining amount and reading the scale to determine an actual first remaining amount dispensed;
   g) subtracting the actual first remaining amount dispensed from said first remaining amount to generate a difference, multiplying the difference by the factor and adding the result to said first remaining amount to calculate a second remaining amount and calculating a motion of the pump required to dispense said second remaining amount; and
   h) executing said motion of the pump required to dispense said second remaining amount, wherein the motions of the pump of parts (f) and (h) are executed by a stepper motor tinder the control of a controller and the calculating of the motions of the pump in parts (e) and (g) comprises using a calibration table comprising a set of data points to calculate the number of steps for the stepper motor, each data point corresponding to a number of steps of the stepper motor and an amount of said one of the ingredients, the using of the calibration table further comprising using a linear approximation of a number of steps S according to an equation $S = A \cdot V + B$ where A is a slope of the linear approximation and B is a y-intersect of the linear approximation, A and B are calculated from the calibration table using a least square method for the set of data points and V is first remaining amount for part (e) and the second remaining amount for part (g).

2. The method of claim 1 further comprising:
   i) reading the scale to determine an actual amount dispensed after the dispensing of said second remaining amount.

3. The method of claim 2 further comprising:
   j) if the reading of the scale indicates that more of said one of the n ingredients is needed to meet the target amount, repeating parts (e) through (h).

4. The method of claim 1 further comprising:
   i) repeating parts (b) through (h) for each of said n ingredients.

5. The method of claim 1 wherein said less than the target amount of part (b) ranges from about 70% to about 95% of the target amount.

6. The method of claim 1 wherein the pump is a piston pump and the remaining amount of part (d) is an amount that is less than two full strokes of the piston pump.

7. The method of claim 1 wherein the pump is a metering pump and the remaining amount of part (d) is an amount less than two rotations of a screw feeder of said metering pump.

8. The method of claim 1 further comprising placing a receptacle on the scale and reading the scale and accounting for a weight of the receptacle.

9. The method of claim 1 wherein each of the n ingredients is provided in its own reservoir that is in communication with its own pump and the pumps are mounted on a rotary turntable.

10. The method of claim 1 wherein the selecting further comprises selecting the formula from a memory in which a plurality of formulas are stored.

11. The method of claim 10 wherein the selecting further comprises selecting a total weight of the formula to be dispensed in addition to the selecting of the formula.

12. The method of claim 1 wherein part (e) comprises using a calibration table to calculate the motion of the pump.

13. The method of claim 1 wherein only a portion of the data points in a vicinity of the first remaining amount is used for the least square method of calculating of A and B in part (e) and only a portion of the data points in a vicinity of the second remaining amount is used for the least square method of calculating A and B in part (g).

14. The method of claim 13 wherein the about five data points are used in the least square methods of parts (e) and (g).

15. The method of claim 1 wherein new values for S, A and B are calculated at least once for each dispense and stored in the calibration table.

16. A method of dispensing a plurality of flowable ingredients provided in individual containers and utilizing individually controlled dispense pumps that each draw one flowable ingredient from its individual container, the pumps being positionable to dispense into a common receptacle associated with a weighing device, the weighing device and pumps linked to a controller having a memory, the method comprising:

operating a selected pump to move an initial assumed amount of one of the flowable ingredients that is less than a target amount for said ingredient into the container, weighing the container and determining an actual initial amount dispensed and subtracting that actual initial amount from the target amount to determine a remaining amount, dividing the remaining amount by 2 to generate a first half amount, calculating movement of the pump needed to dispense the first half amount of the flowable ingredient into the container, wherein movement of the pump is executed by a stepper motor under the control of a controller and the calculating of the movement of the pump needed to dispense the first half amount comprises using a calibration table comprising a set of data points to calculate the number of steps for the stepper motor, each data point corresponding to a number of steps of the stepper motor and an amount of said one of the flowable ingredients, the using of the calibration table further comprising using a linear approximation of a number of steps $S_1$ for the first half amount according to an equation $S_1=A_1 \cdot V_1+B_1$ where $A_1$ is a slope of the linear approximation and $B_1$ is a y-intersect of the linear approximation, $A_1$ and $B_1$ are calculated from the calibration table using a least square method for the set of data points and $V_1$ is first half amount, moving the pump to dispense the first half amount and weighing the container and determining an actual first half amount dispensed by the pump, comparing the actual first half amount to the first half amount and determining a first deviation determination, utilizing the first deviation determination to adjust the first half amount and calculate a second half amount, calculating movement of the pump needed to dispense the second half amount, the calculating of the movement of the pump needed to dispense the second half amount comprises using the calibration table by using a linear approximation of a number of steps $S_2$ for the second half amount according to an equation $S_2=A_2 \cdot V_2+B_2$ where $A_2$ is a slope of the linear approximation and $B_2$ is a y-intersect of the linear approximation, $A_2$ and $B_2$ are calculated from the calibration table using a least square method for the set of data points and $V_2$ is second half amount, moving the pump to dispense the second half amount.

17. The method of claim 16 wherein only a portion of the data points in a vicinity of the first half amount are used for the least square method of calculating of $A_1$ and $B_1$ and only a portion of the data points in a vicinity of the second half amount amount are used for the least square method of calculating $A_2$ and $B_2$.

18. The method of claim 16 wherein the calibration table is modified after determining the first deviation determination and the calculating of the movement of the selected pump needed to dispense the second half amount comprises using the modified calibration table.

19. The method of claim 18 further comprising weighing the container and determining an actual second half amount dispensed and comparing the actual second half amount to the second half amount and determining a second deviation determination and modifying the calibration table again based on the second deviation determination.

20. A flowable ingredient dispenser comprising:

a scale; the scale linked to a controller, the controller comprising a memory with a plurality of formulas, each formula comprising n amounts of n ingredients, wherein n is an integer, the controller selectively linked to a plurality of pumps by an activator, each pump coupled to a separate reservoir containing one of said ingredients, the controller being linked to a user interface, the controller being programmed to receive an instruction from a user interface to execute the dispensing of one of said formulas, and upon receiving said instruction, the controller carrying out a sequence comprising a) selecting a formula calling for n ingredients, with each ingredient having a target amount, wherein n is an integer;

b) calculating a motion of the pump required to dispense less than the target amount of said one of then ingredients;

c) executing a percentage of said motion of the pump required to dispense said less than the amount of said one of the n ingredients;

d) reading a scale and determining an additional amount of said one of the ingredients needed to meet the target;

e) dividing said additional amount by 2 to calculate a first half amount and calculating a motion of the pump required to dispense said first half amount based on a calibration formula stored in the memory, wherein motion of the pump is executed by a stepper motor under the control of a controller and the calculating of the motion of the pump needed to dispense the first half amount comprises using a calibration table comprising a set of data points to calculate the number of steps for the stepper motor, each data point corresponding to a number of steps of the stepper motor and an amount of said one of the n ingredients, the using of the calibration table further comprising using a linear approximation of a number of steps S1 for the first half amount according to an equation $S_1=A_1 \cdot V_1+B_1$ where $A_1$ is a slope of the linear approximation and $B_1$ is a y-intersect of the linear approximation, $A_1$ and $B_1$ are calculated from the calibration table using a least square method for the set of data points and $V_1$ is first half amount;

f) executing said calculated motion of the pump required to dispense said first half amount and reading the scale to determine an actual first half amount dispensed;

g) subtracting the actual first half amount from said first half amount to generate a first difference, multiplying the difference by 2 and adding the result to said first half amount to calculate a second half amount;

h) calculating a motion of the pump required to dispense said second half amount, the calculating of the movement of the selected pump needed to dispense the second half amount comprises using the calibration table to calculate the number of steps for the stepper motor using a linear approximation of a number of steps 52 for the second half amount according to an equation $S_2=A_2 \cdot V_2+B_2$ where $A_2$ is a slope of the linear approximation and $B_2$, is a y-intersect of the linear approximation, $A_2$ and $B_2$ are calculated from the calibration table using a least square method for the set of data points and $V_2$ is second half amount;

i) executing said motion of the pump required to dispense said second half amount;

j) reading the scale to determine an actual second half amount dispensed, subtracting the actual second half amount from said second half amount to generate a second difference;

k) using at least one of the first or second differences or both to modify the calibration formula.

* * * * *